(12) United States Patent
Ninose et al.

(10) Patent No.: US 10,146,435 B2
(45) Date of Patent: Dec. 4, 2018

(54) STORAGE SYSTEM AND DATA WRITE METHOD

(71) Applicant: Hitachi, Ltd., Tokyo (JP)

(72) Inventors: Kenta Ninose, Tokyo (JP); Junji Ogawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 715 days.

(21) Appl. No.: 14/766,847

(22) PCT Filed: Jul. 31, 2013

(86) PCT No.: PCT/JP2013/070821
§ 371 (c)(1),
(2) Date: Aug. 10, 2015

(87) PCT Pub. No.: WO2015/015611
PCT Pub. Date: Feb. 5, 2015

(65) Prior Publication Data
US 2016/0011786 A1    Jan. 14, 2016

(51) Int. Cl.
*G06F 3/06* (2006.01)
*G06F 12/02* (2006.01)
*G06F 11/10* (2006.01)

(52) U.S. Cl.
CPC .......... *G06F 3/0608* (2013.01); *G06F 3/0616* (2013.01); *G06F 3/0659* (2013.01); *G06F 3/0661* (2013.01); *G06F 3/0679* (2013.01); *G06F 3/0688* (2013.01); *G06F 11/108* (2013.01); *G06F 12/0246* (2013.01); *G06F 2211/1014* (2013.01); *G06F 2212/401* (2013.01); *G06F 2212/7204* (2013.01); *G06F 2212/7207* (2013.01); *G06F 2212/7208* (2013.01)

(58) Field of Classification Search
CPC .......... G06F 12/0246; G06F 2212/401; G06F 2212/7204; G06F 2212/7207; G06F 2212/7208; G06F 3/0608; G06F 3/0661; G06F 3/0679; G06F 2211/1014; G06F 11/108; G06F 3/0616; G06F 3/0659; G06F 3/0688
See application file for complete search history.

(56) References Cited

U.S. PATENT DOCUMENTS

2008/0263244 A1  10/2008  Mizuno
2011/0320915 A1  12/2011  Khan

FOREIGN PATENT DOCUMENTS

JP          2008-269050 A         11/2008

OTHER PUBLICATIONS

International Search Report of PCT/JP2013/070821.

*Primary Examiner* — Reginald G Bragdon
*Assistant Examiner* — Hannah A Faye-Joyner
(74) *Attorney, Agent, or Firm* — Mattingly & Malur, PC

(57) ABSTRACT

A storage system includes a plurality of storage devices, each including a storage medium and a compression function for data, and a storage controller coupled to the plurality of storage devices. The storage controller includes compression necessity information indicating necessity of compression of the data in a write command to be transmitted to a storage device at a write destination among the plurality of storage devices. The storage device at the write destination writes, when the compression necessity information included in the received write command indicates that compression is unnecessary, the data in the storage medium without compressing the data.

5 Claims, 23 Drawing Sheets

Fig. 6

Virtual-logical LBA mapping table — 210

| Virtual volume LBA (212) | Logical volume ID (213) | Logical volume LBA (214) |
|---|---|---|
| 0x00001000 | NULL | NULL |
| 0x00002000 | #0001 | 0x10001000 |
| 0x00003000 | #FFBA | 0x12345678 |
| 0x00004000 | NULL | NULL |

211a (row 1), 211b (row 2)

Fig. 7

Volume management table (220)

| Volume ID (222) | Volume type (223) | Volume capacity (224) | Pool number (225) | Volume attribute (226) |
|---|---|---|---|---|
| 0 | Logical volume | 1TB | - | - |
| 1 | Virtual volume | 2TB | 10 | - |
| : | | | | |
| 10 | Virtual volume | 1.5TB | 10 | Encryption |
| : | | | | |
| 100 | Logical volume | 3TB | - | Compression |

| Pool management table (230) | |
|---|---|
| Logical volume ID (232) | Reference destination of logical-virtual LBA mapping table (233) |
| #0001 | 0xAB8FFF00 |
| #FFBA | 0x00115800 |
| #0020 | 0x808F2240 |

Fig. 9

| Logical-virtual LBA mapping table (240) | | |
|---|---|---|
| Logical volume LBA (242) | Virtual volume ID (243) | Virtual volume LBA (244) |
| 0x01001000 | NULL | NULL |
| 0x01002000 | NULL | NULL |
| 0x01003000 | #8001 | 0x00101000 |
| 0x01004000 | NULL | NULL |

241a: rows 1-2
241b: row 3

Fig. 14

| Logical page number | Physical page number | Compression attribute | Start address | |
|---|---|---|---|---|
| 0 | 100 | Uncompressed | — | |
| 1 | 500 | Compressed | 0 | ⟵ 311a |
| 2 | Unallocated | — | — | |
| ⋮ | ⋮ | ⋮ | ⋮ | |
| 100 | 300 | Uncompressed | — | |
| ⋮ | ⋮ | ⋮ | ⋮ | |
| 1000 | 500 | Compressed | 4096 | ⟵ 311b |
| ⋮ | ⋮ | ⋮ | ⋮ | |

(Logical-physical page mapping table) — 310

Fig. 15

| Physical page number | Logical page number | Compression state | |
|---|---|---|---|
| 0 | Unallocated | | |
| : | | | |
| 100 | 0 | Unnecessary | |
| : | : | | |
| 300 | 100 | Planned | ← 331a |
| : | : | | |
| 500 | 1,1000 | Compressed | ← 331b |
| : | : | | |

(Physical-logical page mapping table) — 330
332 — Physical page number
333 — Logical page number
334 — Compression state

STORAGE SYSTEM AND DATA WRITE METHOD

TECHNICAL FIELD

The present invention relates to a technique for compression of data in a storage device in a storage system.

BACKGROUND ART

An amount of data (e.g., content data) stored in a storage system has been steadily increasing. When a large number of storage devices are mounted in order to increase a data amount storable in the storage system, costs of the storage system increase. This is unfavorable for a user. Therefore, there is a technique for substantially increasing the storable data amount by compressing and storing data.

In recent years, a storage device (e.g., a SSD (Solid State Drive)) in which a flash memory is used as a storage medium is used for a storage system. The SSD can perform high-speed input and output compared with a HDD (Hard Disk Drive). However, since bit cost of the SSD is high compared with the HDD, there is a demand for a technique for reducing the bit cost by compressing and storing data. The compression of the data is performed by a controller or the storage device of the storage system. The controller of the storage system controls the entire system such as input/output processing and copy processing for the data. When the controller of the storage system is caused to execute compression processing, this causes performance deterioration of the entire system. Therefore, there is a technique in which the storage device executes the data compression (PTL 1).

CITATION LIST

Patent Literature

[PTL 1]
US2011/0320915

SUMMARY OF INVENTION

Technical Problem

However, there is data, a data size of which hardly changes even if the data is compressed (a compression effect of which is small). A SSD having a compression function described in PTL 1 compresses all received data once and, when a compression effect of the data is small, stores the data in an uncompressed state. This is because the SSD alone can determine whether there is the compression effect only after the SSD actually compresses the data and checks a data size after the compression. Processing for compressing data having a small compression effect is useless overhead and causes performance deterioration.

Therefore, it is an object of the present invention to reduce, in a storage system, performance deterioration of the storage system, which could be caused by compression processing, according to cooperation of a controller and a storage device of the storage system.

Solution to Problem

A storage system according to an embodiment of the present invention includes a plurality of storage devices, each including a storage medium and a media controller having a compression function for data to be written in the storage medium. The storage system includes a storage controller configured to receive a first write request for first data from a host computer and transmit a first write command, which is a write command for second data based on the first data and includes compression necessity information indicating necessity of compression of the second data, to a storage device at a write destination conforming to the first write request among the plurality of storage devices. The media controller of the storage device at the write destination receives the first write command from the storage controller and, when the compression necessity information included in the first write command indicates that compression is unnecessary, stores the second data in the storage medium without compressing the second data.

Advantageous Effects of Invention

According to the present invention, it is possible to reduce performance deterioration of a storage that could be caused by compression processing for reducing bit cost.

BRIEF DESCRIPTION OF DRAWINGS

FIG. 6 shows a configuration example of a virtual-logical LBA (Logical Block Address) mapping table.

FIG. 7 shows a configuration example of a volume management table.

FIG. 8 shows a configuration example of a pool management table.

FIG. 9 shows a configuration example of a logical-virtual LBA mapping table.

FIG. 14 shows a configuration example of a logical-physical page mapping table.

FIG. 15 shows a configuration example of a physical-logical page mapping table.

DESCRIPTION OF EMBODIMENTS

An embodiment of a storage system in which a write command is extended to make it possible to communicate compression necessity in an FMPK (Flash Memory Package) 30 from a storage controller 20 to the FMPK 30 is explained with reference to the drawings. The level of a compression effect depends on a data pattern. Since a data pattern of encrypted data is random, a compression effect of the encrypted data is often small. Usually, a storage controller retains information concerning encryption but a storage device does not have such information. Therefore, it is possible to reduce overhead of unnecessary compression processing by notifying the storage device of compression necessity on the basis of the information retained by the storage controller.

First Embodiment

Figure 1:
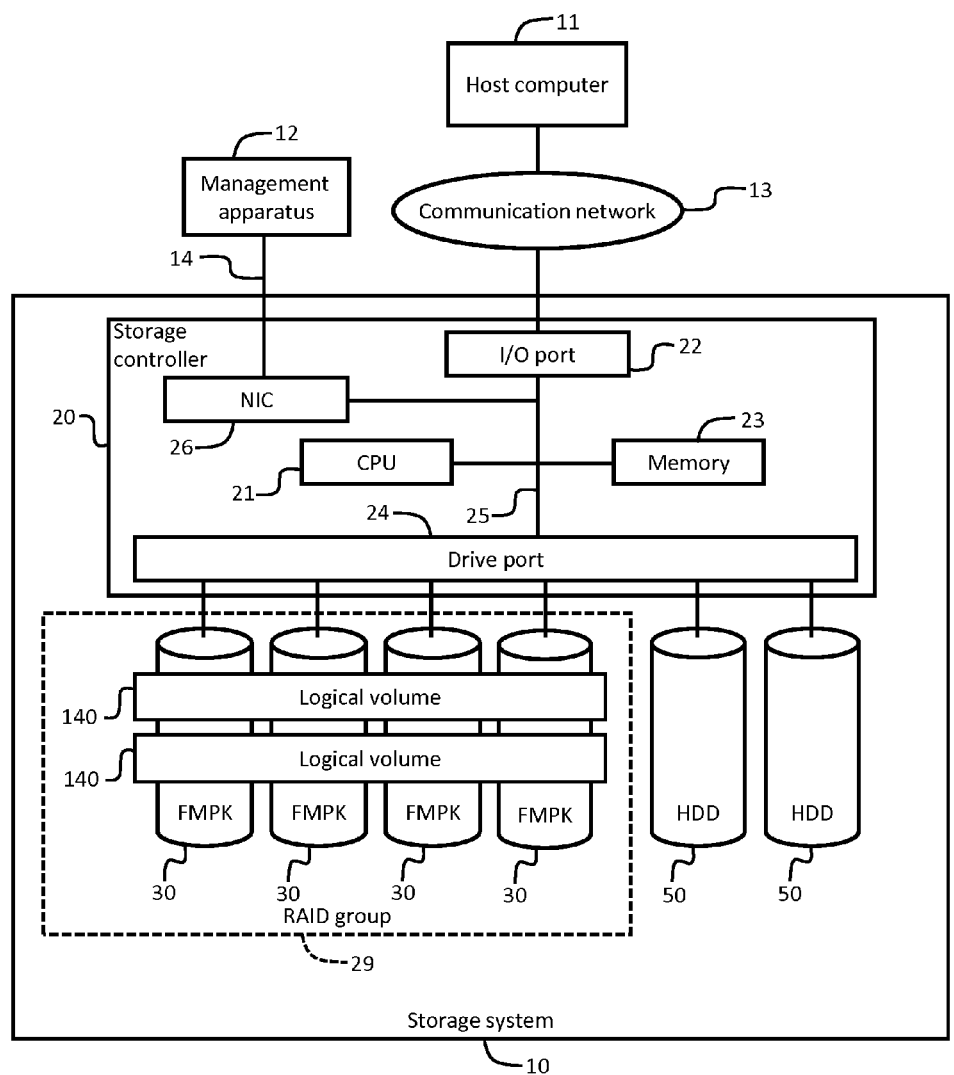
FIG. 1 is a block diagram showing a hardware configuration example of a storage system.

FIG. 1 is a block diagram showing a hardware configuration example of a storage system 10.

A host computer 11 and the storage system 10 can bi-directionally transmit and receive data through a communication network 13. The communication network 13 may be configured by a LAN (Local Area Network), a WAN (Wide Area Network), a SAN (Storage Area Network), or a combination of these networks.

A management apparatus 12 and the storage system 10 can bi-directionally transmit and receive data through a predetermined communication line 14. Instead of the communication line 14, the communication network 13 or another communication network may be adopted. The management apparatus 12 and a NIC (Network Interface Card) included in the storage controller 20 may be coupled by a communication line 14.

The host computer 11 is a computer and can transmit a write request and a read request to the storage system 10. The storage controller 20 can receive the write request or the read request and write or read data according to the received write request or read request.

The management apparatus 12 is a computer and manages the storage system 10. The management apparatus 12 includes, for example, an input I/F (Interface) such as a keyboard and a mouse and an output I/F such as a display and a speaker. For example, an administrator can configure a RAID (Redundant Arrays of Inexpensive Disks) group 29 in the storage system 10 and set a RAID level through the management apparatus 12. The storage system 10 configures, according to the RAID level set from the management apparatus 12, the RAID group 29 in which data is stored.

The storage system 10 includes a plurality of storage devices (FMPKs 30, HDDs 50, and the like) and the storage controller 20 coupled to the plurality of storage devices.

The storage controller 20 controls the operation of the storage system 10. The storage controller 20 includes, for example, an I/O port 22, a memory 23, a NIC 26, a drive port 24, and a CPU (Central Processing Unit) 21 coupled to the foregoing. These components 21 to 24 and 26 are coupled by an internal bus 25 capable of bi-directionally transmitting and receiving data.

The I/O port 22 is an I/F for coupling the storage controller 20 to the communication network 13. The storage controller 20 transmits and receives data to and from the host computer 11 through the I/O port 22. The storage controller 20 may include a plurality of the I/O ports 22.

The drive port 24 is an I/F for coupling storage devices such as the FMPK 30 and the HDD 50 to the storage controller 20. The drive port 24 is an I/F conforming to, for example, a SAS (Serial Attached SCSI), a SATA (SerialATA), and/or a SCSI (Small Computer System Interface). The storage controller 20 may include a plurality of the drive ports 24. A plurality of the FMPKs 30 and a plurality of the HDDs 50 may be coupled to the drive port 24.

The CPU 21 controls the storage controller 20. The CPU 21 executes a computer program (hereinafter referred to as "program") read from the memory 23 and realizes various functions of the storage controller 20. The CPU 21 may include an arithmetic circuit specialized for predetermined processing.

The memory 23 stores programs, data, and the like. The memory 23 may be a volatile memory such as a DRAM (Dynamic Random Access Memory) or may be a nonvolatile memory such as a flash memory.

Processing in this specification and the like explained assuming that the storage controller 20 is a subject may be processing executed by the CPU 21 in cooperation with the components 22 to 26.

The storage device includes a nonvolatile storage medium. The nonvolatile storage medium is, for example, a magnetic disk, a flash memory, or other semiconductor memories (a PRAM (phase change memory), a ReRAM (resistance change memory), a MRAM (magnetic resistance memory), and the like).

A storage medium of the FMPK 30 is configured from a plurality of FM (Flash Memory) chips. A storage medium of the HDD 50 is a magnetic disk. The FMPK 30 and the HDD 50 are coupled to the storage controller 20.

The RAID group 29 is configured from a plurality of storage devices. A plurality of logical volumes (or one logical volume) 140 are created on the basis of the RAID group 29. The logical volume 140 created on the basis of the RAID group 29 may be provided to the host compute 11 or may be set as one component of a pool 100 (see FIG. 2) without being provided to the host computer 11. The logical volume 140 configuring a pool 100 is divided into a plurality of storage areas (hereinafter referred to as "chunks" for convenience). The chunk is allocated to a virtual volume 160 (see FIG. 2) from the pool 100. A relation between the logical volume 140 and the virtual volume 160 is explained below.

The storage controller 20 provides the host computer 11 with at least one of the logical volume 140 and the virtual volume 160. In this specification and the like, the logical volume 140 and the virtual volume 160 are sometimes referred to as volumes without being distinguished. The host computer 11 can transmit a read request and a write request that designate a volume provided from the storage controller 20. The read request includes read source information. The write request includes write destination information. The write destination information includes an ID (e.g., a LUN (Logical Unit Number)) of a volume at a write destination and an address (e.g., an LBA (Logical Block Address) of an area at a write destination. The read source information includes an ID of a volume at a read source and an address of an area at a read source.

The storage device may have a compression function on the inside. In this embodiment, the FMPK, which is the storage device, has the compression function. The storage device having the compression function compresses data with the compression function and stores the compressed data in a storage medium on the inside. The storage device having the compression function expands the compressed data with the compression function and transmits the expanded data to the outside of the storage device. The storage device having the compression function controls whether the data is compressed and stored or stored without being compressed or whether the compressed data is expanded and transmitted or transmitted without being expanded.

Figure 2:
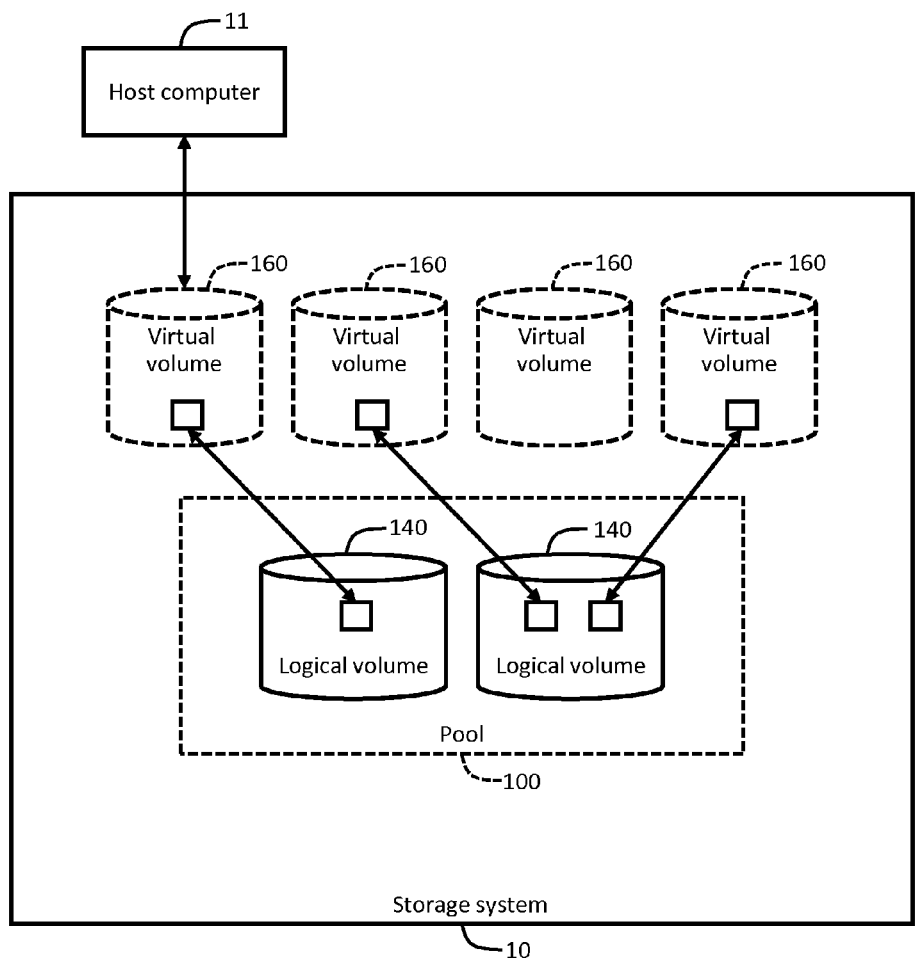
FIG. 2 is a schematic diagram for explaining a relationship between a virtual volume and a logical volume.

FIG. 2 is schematic diagram for explaining a relationship between the virtual volume 160 and the logical volume 140.

As shown in FIG. 1, the storage controller 20 can create one or two or more logical volumes 140 in the RAID group 29.

The storage controller 20 divides the logical volume 140 into a plurality of chunks (storage areas) and manages the chunks. The storage controller 20 manages the plurality of chunks included in the respective plurality of logical volumes 140 collectively as one pool 100. That is, the pool 100 includes the plurality of chunks.

The storage controller 20 can create the virtual volume 160 conforming to thin provisioning. At a stage when the storage controller 20 creates the virtual volume 160, the storage controller 20 sets a capacity and a logical address space (LBA) of the virtual volume 160. However, the storage controller 20 does not allocate the chunks from the pool 100 to the virtual volume 160 at this stage.

When the storage controller 20 receives, from the host computer 11, a write request that designates the virtual volume 160, the storage controller 20 selects a usable chunk from the pool 100 and allocates the selected chunk to an area corresponding to an LBA designated by the write request. The storage controller 20 writes data (write data) complying with the write request in the allocated chunk. When a chunk is already allocated to the LBA designated by the write request, the storage controller 20 does not need to allocate a chunk to the LBA anew.

Since the virtual volume 160 is used, it is possible to efficiently use the storage areas included in the storage system 10.

The storage controller 20 transmits a write command to the storage device at a write destination among the plurality of storage devices and transmits a read command to the storage device at a read source. The write command includes an address (e.g., an LBA) of the write destination. The read command includes an address (e.g., an LBA) of the read source. The storage device at the write destination is the storage device, which is a base of an area (e.g., a chunk) at the write destination conforming to the write request. The storage device at the read source is the storage device, which is a base of an area (e.g., a chunk) at the read source conforming to the read request.

In this embodiment, a volume provided to the host computer 11 is the virtual volume 160. The logical volume 140 is a component of the pool 100.

Figure 3:
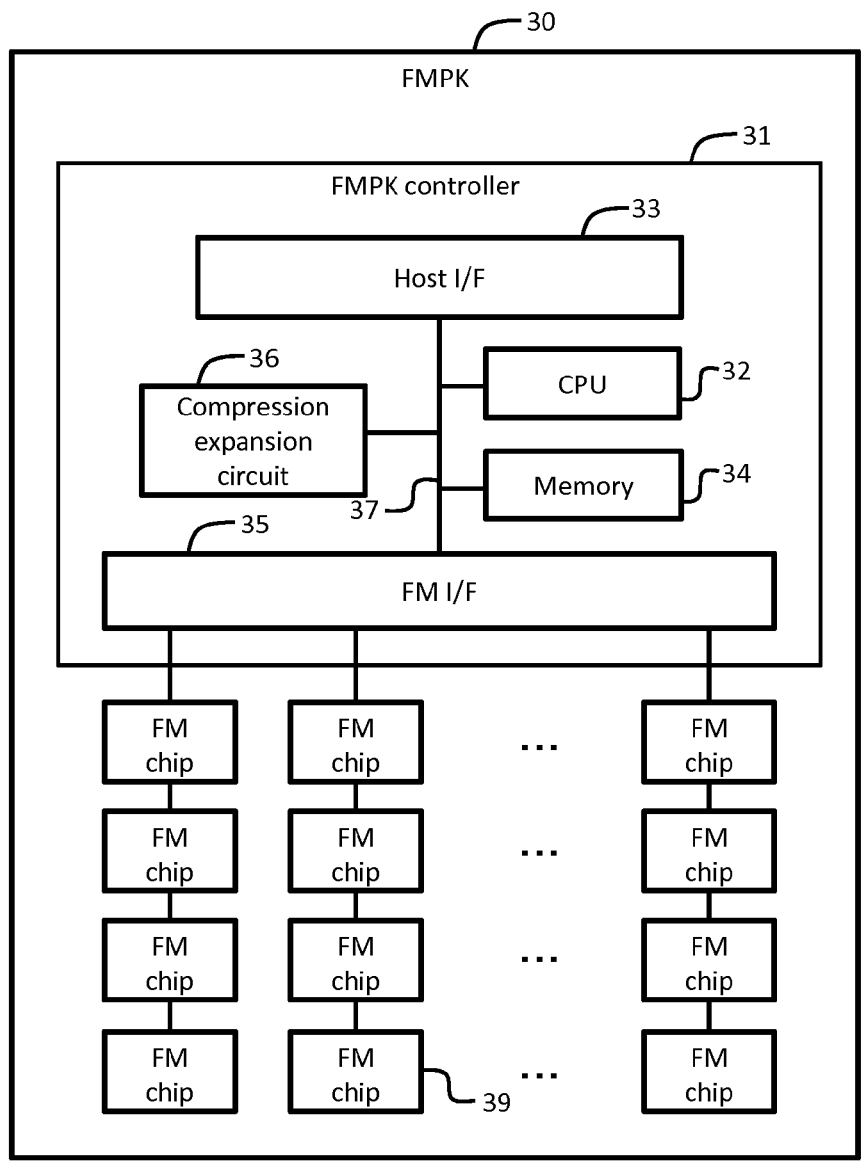
FIG. 3 is a block diagram showing a hardware configuration example of an FMPK (Flash Memory Package).

FIG. 3 is a block diagram showing a hardware configuration example of the FMPK 30.

The FMPK 30 includes a flash memory and an FMPK controller 31 coupled to the flash memory. The flash memory is configured by a plurality of FM chips 39. The FMPK controller 31 includes a memory 34, a compression expansion circuit 36, a host I/F 33, an FM I/F 35, and a CPU 32 coupled to the foregoing. The components 32 to 36 are coupled by an internal bus 37 capable of bi-directionally transmitting and receiving data.

The CPU 32 controls the operation of the FMPK 30. The CPU 32 executes a program read from the memory 34 and realizes various functions of the FMPK 30. The CPU 32 may include an arithmetic circuit specialized for predetermined processing.

The memory 34 stores programs, data, and the like. For example, the memory 34 may be a volatile semiconductor memory such as a DRAM or may be a nonvolatile memory such as a flash memory.

The compression expansion circuit 36 is an arithmetic circuit for performing compression processing and expansion processing for data. The CPU 32 compresses, using the compression expansion circuit 36, write data received from the storage controller 20 and then writes the write data in the FM chip 39. Alternatively, the CPU 32 expands, using the compression and expansion circuit 36, compressed data read from the FM chip 39 and then transmits the expanded data to the storage controller 20.

The host I/F 33 is an I/F for coupling the FMPK 30 to the storage controller 20. The CPU 32 receives a write command, write data, and the like from the storage controller 20 through the host I/F 33. The CPU 32 transmits a completion response and the like to the storage controller 20 through the host I/F 33.

The FM I/F 35 is an I/F for coupling the FM chip 39. A plurality of FM chips are coupled to the FM I/F 35. The CPU 32 writes data in the FM chip 39 and reads data stored in the FM chip 39 through the FM I/F 35. The FM chip 39 is, for example, an FM chip of a NAND type and includes a plurality of physical blocks. Each of the physical blocks is configured by a plurality of pages. Read and write of data are performed in page units. Erasing of data is performed in block units. Data cannot be written anew in a physical page in which data is stored. New data is written in a free physical page.

As explained above, the components 32 to 37 are collectively referred to as FMPK controller 31. In this specification and the like, processing explained assuming that the FMPK controller 31 is a subject may be processing executed by the CPU 32 in cooperation with the components 33 to 37.

Figure 4:
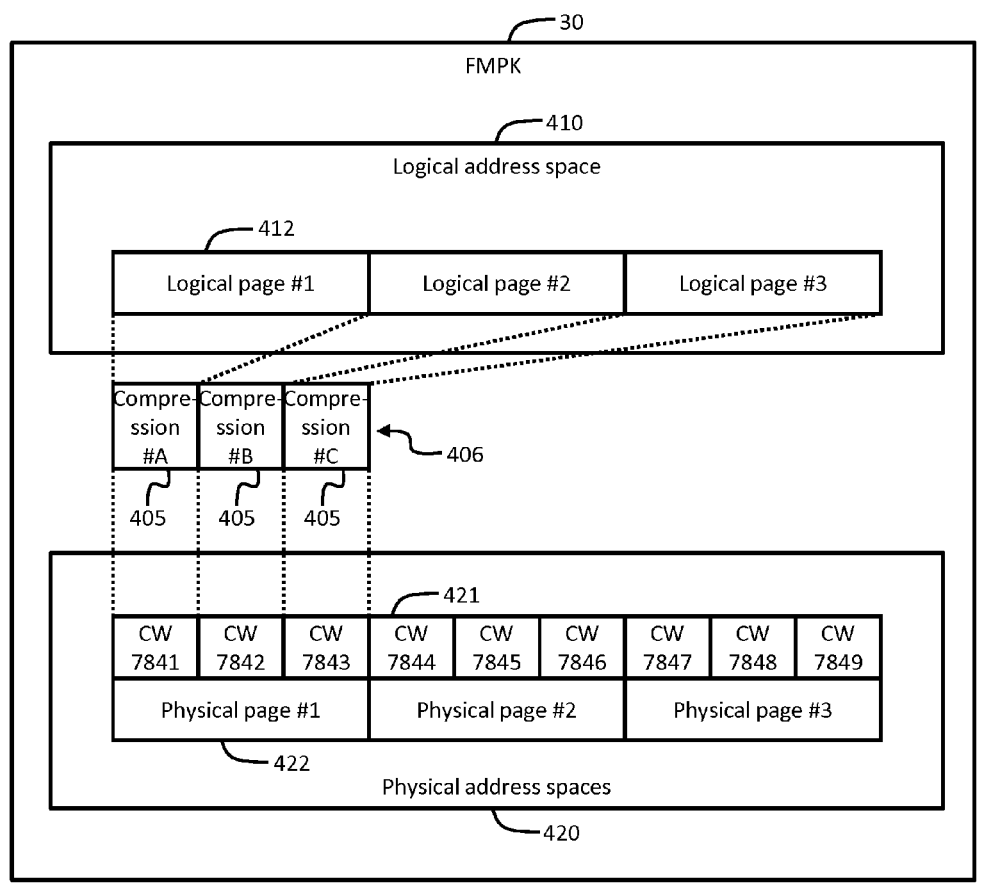
FIG. 4 is a schematic diagram showing an example of a state in which compressed data is stored in the FMPK.

FIG. 4 is a schematic diagram showing an example of a state in which compressed data is stored in the FMPK 30.

The FMPK controller 31 includes a physical address space 420 configured on the basis of a physical storage area of the FM chip 39 and a logical address space 420 provided to the storage controller 20 and manages a correspondence relation between the physical address space 420 and the logical address space 410.

The FMPK controller 31 divides the logical address space 410 into logical pages 412 in predetermined units and manages the logical pages 412. The physical address space 420 is configured by a plurality of physical pages 422 of a flash memory. The FMPK controller 31 manages a correspondence relation between the logical page 412 and the physical page 422. Data (data in page units) stored in one physical page 422 is a set of one or two or more CWs (Code Words) 421. The CW is, for example, a set of data and ECC (Error Check and Correct). The FMPK controller 31 reads and writes data in units of the physical page 422 as explained above because of a characteristic of the flash memory.

For example, the FMPK controller 31 compresses and writes data as explained below.

(1) The FMPK controller 31 creates compressed data 405 #A by compressing write data complying with a write command that designates an LBA of a logical page 412 #1. Similarly, the FMPK controller 31 creates compressed data 405 #B by compressing write data complying with a write command that designates an LBA of a logical page 412 #2 and creates compressed data 405 #C by compressing write data complying with a write command that designates an LBA of a logical page 412 #3. When the size of compressed data 405 is equal to or smaller than the size of the CW 421, one CW 421 is used for the compressed data 405. When the size of the compressed data 405 is larger than the size of the CW 421, the number of CWs 421 enough for storing the compressed data 405 is used. That is, the size of one compressed data 405 can be represented by the number of CWs 421.

(2) The FMPK controller 31 combines or divides the compressed data 405 in units of the CW 421 into compressed data in units of the physical page 422. For example, in the case of FIG. 4, each of the compressed data 405 #A, #B, and #C is equivalent to one CW 421. Therefore, the FMPK controller 31 combines the compressed data 405 #A, #B, and #C and writes the compressed data 405 #A, #B, and #C in a physical page 422 #1 as one data 406. This is because the compressed data 405 needs to be written in units of physical pages because of the characteristic of the flash memory. For example, when the compressed data 405 is equivalent to four CWs 421, the FMPK controller 31 divides the compressed data 405 into compressed data equivalent to three CWs 421 and compressed data equivalent to one CW 421 and writes the respective compressed data in the physical page 422.

Figure 5:
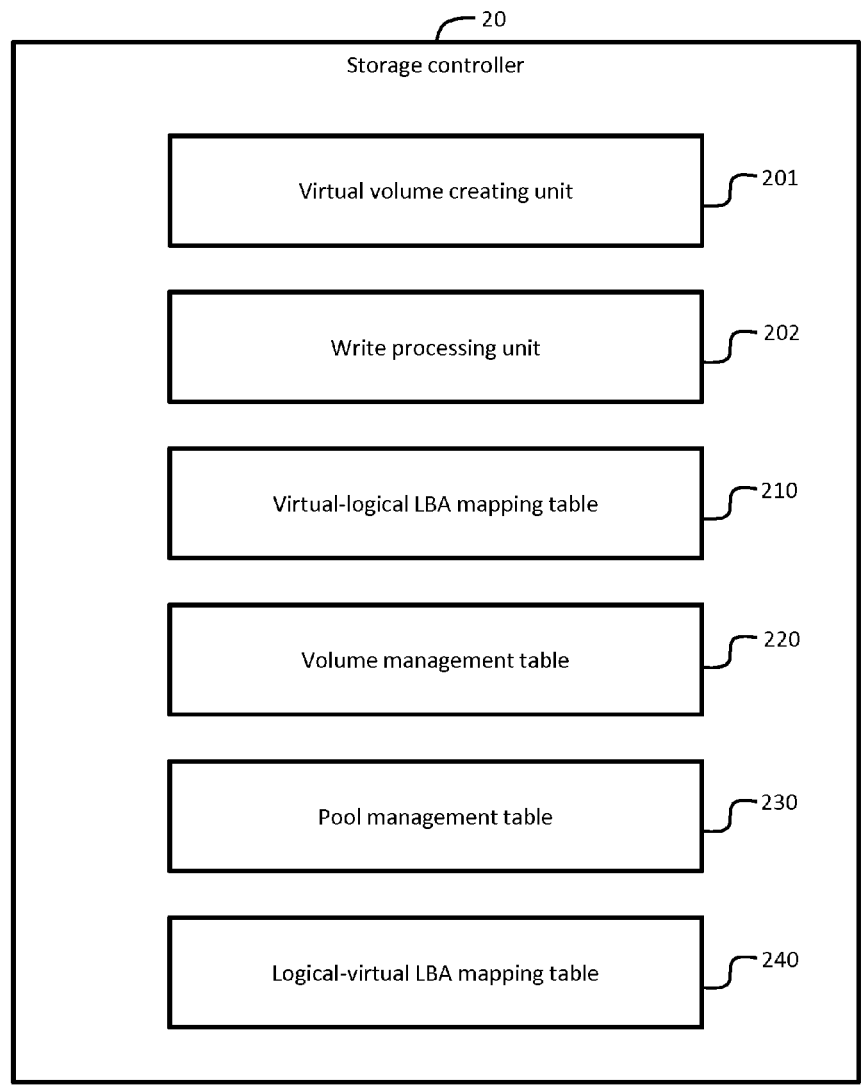
FIG. 5 is a block diagram showing an example of functions of a storage controller.

FIG. 5 is a block diagram showing an example of functions of the storage controller 20.

The storage controller 20 includes, for example, a virtual volume creating unit 201, a command processing unit 202, a virtual-logical LBA mapping table 210, a volume management table 220, a pool management table 230, and a logical-virtual LBA mapping table 240. The virtual volume creating unit 201 and the command processing unit 202 are, for example, functions realized by the CPU 21 executing a program.

The virtual volume creating unit 201 creates the virtual volume 160 on the basis of an indication from the management apparatus 12 (the administrator). For example, the virtual volume creating unit 201 creates the virtual volume 160 on the basis of a volume capacity, a volume attribute, a pool number to be used, and the like indicated by the administration apparatus 12. The management apparatus 12 can set an encryption attribute or a compression attribute as the volume attribute. When the virtual volume 160 in which the encryption attribute is set is a write destination, the storage controller 20 (the command processing unit 202) encrypts write target data and stores the encrypted write target data in the virtual volume 160 (an allocated chunk) at the write destination. When the virtual volume 160 in which the compression attribute is set is the write destination, the storage controller 20 (the command processing unit 202) compresses the write target data and stores the compressed write target data in the virtual volume 160 at the write destination.

The command processing unit 202 executes write command for data on the basis of a write request from the host computer 11. That is, the command processing unit 202 creates a write command based on the write request and transmits the created write command to a storage device at a write destination.

When the storage device at the write destination is a storage device having the compression function, the command processing unit 202 can include, in the write command to be transmitted to the storage device at the write destination, compression necessity information representing whether compression is necessary. In this embodiment, the storage device having the compression function is the FMPK 30 and an example of the compression necessity information is a compression necessity flag. That is, the command processing unit 202 creates a write command including the compression necessity flag (a compression option) indicating compression necessity in the FMPK 30 and transmits the write command to the FMPK 30. The command processing unit 202 may set necessity of the compression necessity flag (the compression option) on the basis of the volume attribute of the virtual volume 160 designated by the write request. When the volume attribute of the virtual volume 160 designated by the write request is the encryption attribute, the command processing unit 202 may set the compression necessity flag (the compression option) to "unnecessary".

FIG. 6 shows a configuration example of the virtual-logical LBA mapping table 210.

The virtual-logical LBA mapping table 210 is created for each of the virtual volumes 160 and manages with which LBA of which logical volume 140 an LBA related to the virtual volume 160 is associated.

The virtual-logical LBA mapping table 210 includes a plurality of entries 211a, 211b, and the like. Each of the entries includes, as data fields, a virtual volume LBA 212 indicating an LBA of a virtual volume, a logical volume ID 213 indicating an ID of a logical volume, and a logical volume LBA 214 indicating an LBA of the logical volume.

For example, the entry 211b in FIG. 6 indicates that a virtual volume LBA "0x00002000" is mapped to a logical volume LBA "0x10001000" of a logical volume ID "#0001". The entry 211a indicates that the virtual volume LBA "0x00001000" is not mapped to any logical volume 140 (NULL).

FIG. 7 shows a configuration example of the volume management table 220.

The storage controller 20 manages, in the volume management table 220, the volumes (the virtual volume 160 and the logical volume 140) managed by the storage controller 20.

The volume management table 220 includes a plurality of entries 221. Each of the entries includes, as data fields, a volume ID 222, a volume type 223, a volume capacity 224, a pool number 225, and a volume attribute 226.

In the volume ID 222, IDs capable of uniquely identifying, in the storage controller 20, volumes including the logical volume 140 and the virtual volume 160 are stored.

In the volume type 223, information capable of identifying whether a volume corresponding to the volume ID 222 is the logical volume 140 or the virtual volume 160 is stored.

In the volume capacity 224, a capacity of the volume corresponding to the volume ID 222 is stored.

In the pool number 225, a number of the pool 100 configuring the virtual volume 160 corresponding to the volume ID 222 is stored. That is, a chunk included in the pool 100 indicated by the pool number is allocated to the virtual volume 160.

In the volume attribute 226, an attribute of the volume corresponding to the volume ID 222 is stored. For example, in the case of a volume in which the encryption attribute is set, "encrypted" is stored in the volume attribute 226. For example, in the case of a volume in which the compression attribute is set, "compressed" is stored in the volume attribute 226. The volume attribute 226 is set from, for example, the host computer 11.

For example, a volume corresponding to a volume ID "10" indicated by the entry 221 in FIG. 7 is a "virtual volume" of a volume capacity "1.5 TB". The volume indicates that a chunk included in the pool 100 of a pool number "10" is allocated and data is "encrypted" and stored.

FIG. 8 shows a configuration example of the pool management table 230.

The pool management table 230 is created for each of the pools 100 and manages by which logical volume 140 the own pool 100 is configured and which logical-virtual LBA mapping table 240 is associated with the logical volume 140.

The pool management table 230 includes a plurality of entries 231. Each of the entries includes, as data fields, a logical volume ID 232 indicating an ID of a logical volume and a reference destination (a pointer) of the logical-virtual LBA mapping table 240.

For example, the pool management table 230 shown in FIG. 8 indicates that the own pool 100 is configured by logical volumes of logical volume IDs "#0001", "#FFBA", and "#0020". The entry 231 indicates that a reference destination (a pointer) of the logical-virtual LBA mapping table 240 of the logical volume corresponding to the logical volume ID "#0001" is "0xAB8FFF00".

FIG. 9 shows a configuration example of the logical-virtual LBA mapping table 240.

The logical-virtual LBA mapping table 240 is created for each of the logical volumes 140 and manages to which LBA of which virtual volume 160 an LBA related to the logical volume 140 is mapped.

The logical-virtual LBA mapping table 240 includes a plurality of entries 240a and 240b. Each of the entries includes, as data fields, a logical volume LBA 242, a virtual volume ID 243, and a virtual volume LBA 244.

For example, an entry 241b in FIG. 9 indicates that a logical volume LBA "0x01003000" is mapped to a virtual volume LBA "0x00101000" of a virtual volume ID "#8001". An entry 241a indicates that a logical volume LBA "0x01001000" is not mapped to an LBA of any virtual volume 160 (NULL).

Figure 10:
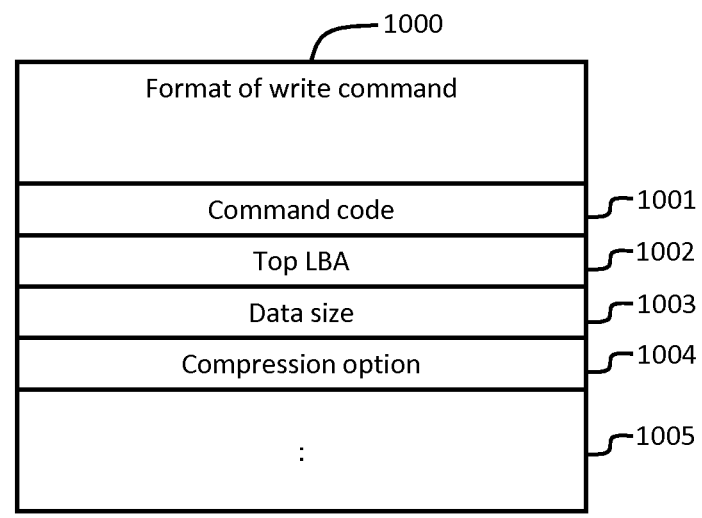
FIG. 10 shows a configuration example of a format of a write command.

FIG. 10 shows a configuration example of a format of a write command 1000.

The storage controller 20 creates the write command 1000 for each of the FMPKs 30 and transmits the created write command 1000 to the FMPK 30 corresponding to the write command 1000.

The write command 1000 includes, as data fields, a command code 1001, a top LBA 1002, a data size 1003, a compression option 1004, and other information 1005.

In the command code 1001, a code indicating that this command is a "write command" is stored. The command code 1001 may be different for a write command attached with a compression option and a normal write command without a compression option.

In the top LBA 1002, an LBA indicating a start position of write of data in the logical address space 410 of the FMPK 30, which is a transmission destination of the command, is stored.

In the data size 1003, a size of data written by the write command 1000 is stored.

In the compression option 1004, a compression necessity flag, which is a flag indicating compression necessity of the data written by the write command, is stored. The compression necessity is determined by the storage controller 20. When the storage controller 20 determines that it is necessary to compress and write the data in the FMPK 30 at the transmission destination of the write command 1000, the storage controller 20 stores "necessary" in the compression necessity flag. When the storage controller 20 determines that it is unnecessary to compress and write the data in the FMPK 30 at the transmission destination of the write command 1000, the storage controller 20 stores "unnecessary" in the compression necessity flag.

Figure 11:
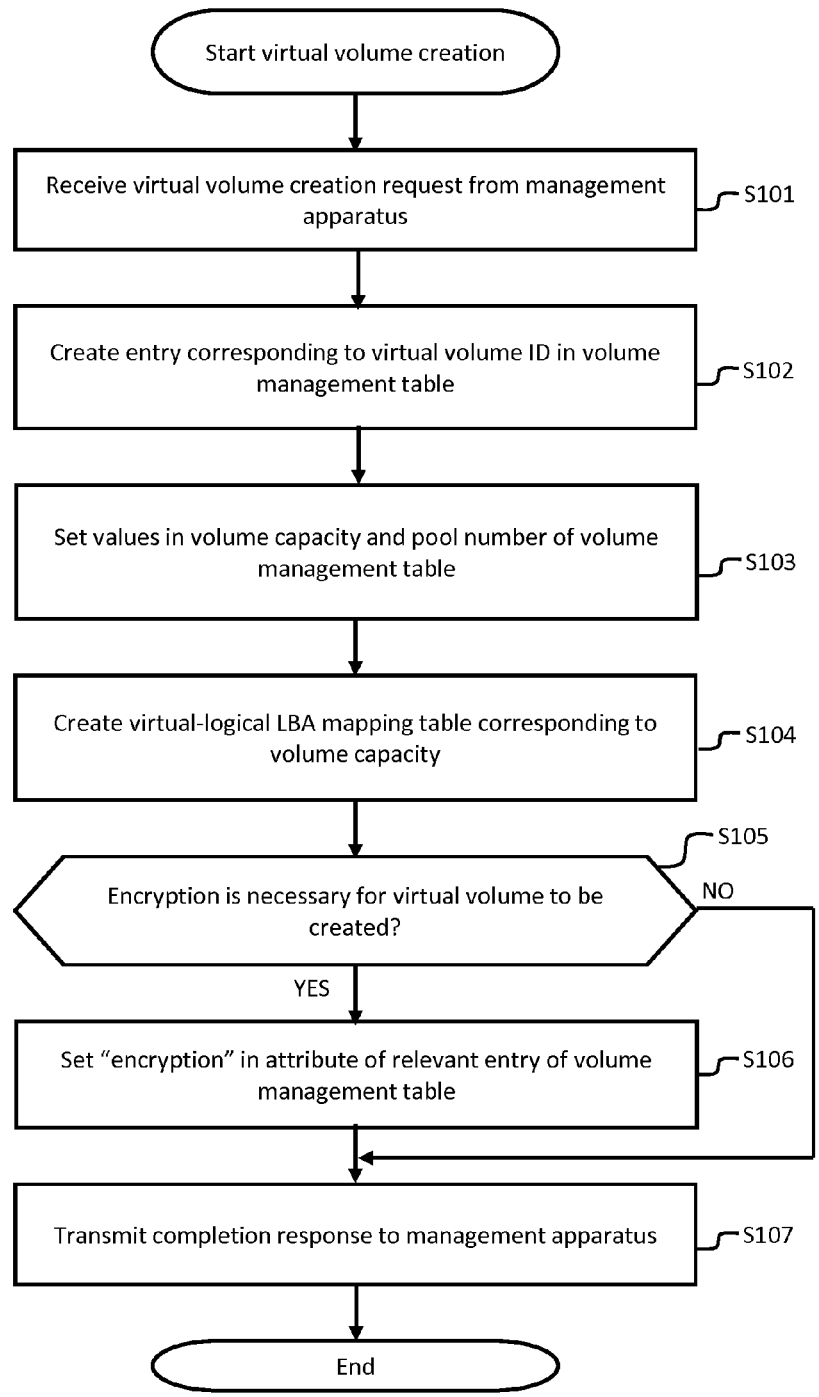
FIG. 11 is a flowchart showing a processing example of a virtual volume creating unit.

FIG. 11 is a flowchart showing a processing example of the virtual volume creating unit 201 in the storage controller 20.

Upon receiving a virtual volume creation request from the management apparatus 12 (S101), the virtual volume creating unit 201 executes subsequent processing.

The virtual volume creating unit 201 creates anew, in the volume management table 220, an entry related to a virtual volume indicated by the virtual volume creation request and stores a "virtual volume" in the volume type 223 of the created entry (S102).

The virtual volume creating unit 201 stores, in the volume capacity 224 and the pool number 225 of the created entry, setting values indicated by the virtual volume creation request (S103).

The virtual volume creating unit 201 creates the virtual-logical LBA mapping table 210 corresponding to the volume capacity 224 (S104).

The virtual volume creating unit 201 determines, from the virtual volume creation request, whether "encrypted" is designated in the volume attribute 226 (S105).

When "encrypted" is not designated (S105: NO), the virtual volume creating unit 201 transmits a completion response to the management apparatus 12 (S107) and ends the processing (end).

When "encrypted" is designated (S105: YES), the virtual volume creating unit 201 sets "encrypted" in the volume attribute 226 of the created entry (S106). The storage controller 20 transmits a completion response to the management apparatus 12 (S107) and ends the processing (end).

According to the processing explained above, the storage controller 20 can create the virtual volume 160 based on the virtual volume creation request.

Figure 12:
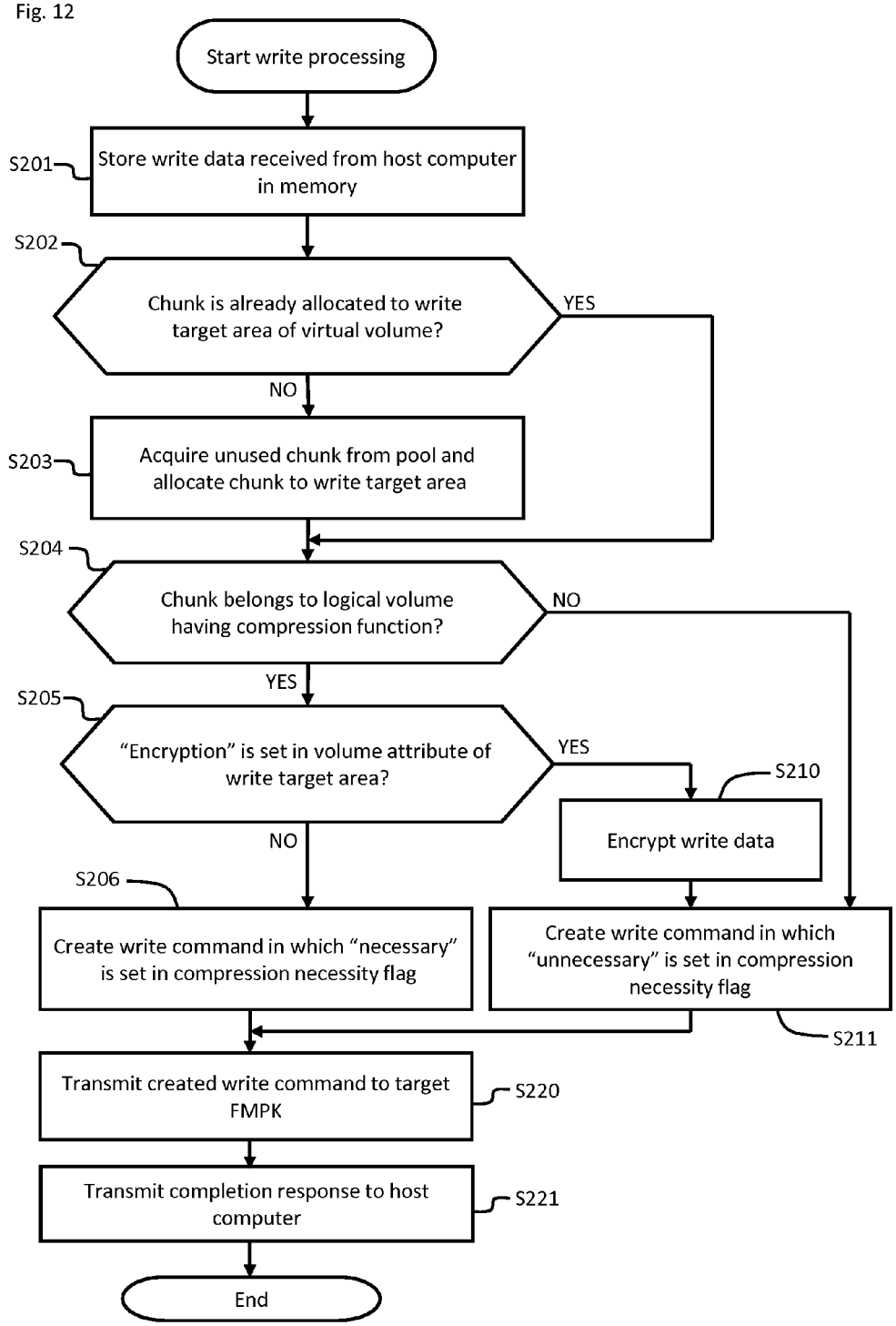
FIG. 12 is a flowchart showing a processing example of a write processing unit in the storage controller.

FIG. 12 is a flowchart showing a processing example of the command processing unit 202 in the storage controller 20.

Upon receiving a write request from the host computer 11, the command processing unit 202 stores write data complying with the write request in the memory 23 (a cache area) (S201).

The command processing unit 202 determines whether a chunk (a logical volume LBA) is already allocated to an area (a virtual volume LBA) at a write destination (hereinafter referred to as "write target area") in the virtual volume 160 designated by the write request (S202).

When a chunk is already allocated to the write target area (S202: YES), the command processing unit 202 proceeds to step S204.

When a chunk is not allocated to the write target area yet (S202: NO), the command processing unit 202 acquires an unused chunk from the pool 100 associated with the virtual volume 160 and allocates the chunk to the write target area (S203). The command processing unit 202 proceeds to step S204.

The command processing unit 202 determines whether the chunk allocated to the write target area belongs to the logical volume 140 having the compression function (S204).

When the chunk belongs to the logical volume 140 not having the compression function (S204: NO), the command processing unit 202 creates the write command 1000 in which "unnecessary" is set in the compression necessity flag (S211) and proceeds to step S220.

When the chunk belongs to the logical volume 140 having the compression function (S204: YES), the command processing unit 202 refers to the volume management table 220 and determines whether "encrypted" is set in the volume attribute 226 of the virtual volume 160 including the write target area (S205).

When "encrypted" is not set in the volume attribute 226 (S205: NO), the command processing unit 202 creates the write command 1000 in which the compression necessity flag is set to "unnecessary" (S206) and proceeds to step S220. This is because data size of unencrypted write data could be reduced by compression (a compression effect of the unencrypted write data is large compared with encrypted data).

When "encrypted" is set in the volume attribute 226 (S205: YES), the command processing unit 202 encrypts the write data (S210). The command processing unit 202 creates the write command 1000 in which "unnecessary" is set in the compression necessity flag (S211) and proceeds to step S220. This is because data size of encrypted write data is hardly reduced even if compressed (the encrypted write data has a small compression effect).

In step S220, the command processing unit 202 transmits the write command 1000 created in step S206 or step S211 to the write target FMPK 30 (S220). The command processing unit 202 transmits a completion response to the host computer 11 (S221) and ends the processing (end). Not that the completion response may be performed between S201 and S202, i.e., when the write data complying with the write request is stored in the memory 23 (the cache area) instead of after S220.

As explained above, the storage controller 20 can determine necessity of compression of write data on the basis of the volume attribute 226 of the volume management table 220 and communicate a result of the determination to the FMPK 30. Consequently, the FMPK 30 can learn whether the write data is to be compressed. Therefore, it is possible to reduce unnecessary compression processing in the FMPK 30. Consequently, a load on the FMPK 30 is reduced and response performance from the FMPK 30 to the storage controller 20 is improved. The storage controller 20 can suppress performance deterioration of the storage system while having the compression function for reducing bit cost of the FMPK 30.

Figure 13:
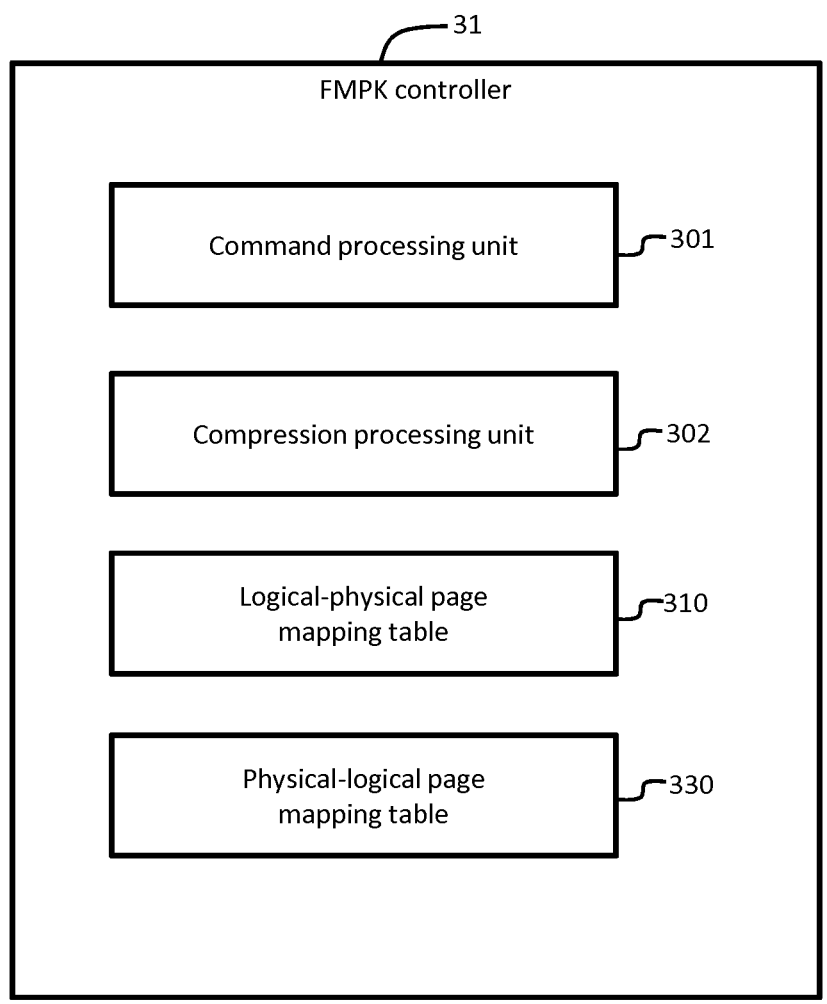
FIG. 13 is a block diagram showing an example of functions of an FMPK controller.

FIG. 13 is a block diagram showing an example of functions of the FMPK controller 31.

The FMPK controller 31 controls read of data from and write of data in the FM chip 39 managed by the FMPK controller 31.

The FMPK controller 31 having the compression function can provide the storage controller 20 with a logical storage capacity (e.g., 8 TB) larger than a physical storage capacity (e.g., 1 TB) by compressing data and writing the data in the FM chip 39.

The FMPK controller 31 has, for example, as setting parameters, asynchronous compression mode and an asynchronous compression mode.

When the synchronous compression mode is set, upon receiving write target data, the FMPK controller 31 compresses the data and writes the compressed data in the FM chip 39.

When the asynchronous compression mode is set, the FMPK controller 31 writes the received data in the FM chip 39 while temporarily keeping the data uncompressed (i.e., without compressing the data), reads the uncompressed data from the FM chip 39 and compresses the uncompressed data at predetermined timing, and writes the compressed data in the same or another FM chip 39. The predetermined timing is, for example, timing of internal processing requiring read of data for movement of the data in the FM chip 39, specifically, for example, time of reclamation of the data.

In the flash memory, data needs to be erased in block units configured by a plurality of physical pages because of the characteristic of the flash memory. Therefore, it is necessary to copy, before erasing data in a certain block, data (effective data) necessary in the block to another block. Such processing is referred to as reclamation processing. In the flash memory, electrons accumulated in a floating gate inside a cell leak because of the characteristic of the flash memory. Therefore, time in which data is retainable with high reliability is limited. Therefore, it is desirable to perform, after writing the data in an FM chip, processing for once reading the data in a fixed time or less and, after correcting a failure bit that occurs in the data, rewriting the data in another block. Such processing is referred to as refresh processing. Since there is a limit in the number of times of erasing (the number of times of write) of data in a block, it is desirable to standardize the numbers of times of erasing of blocks and extend the life of the entire flash memory. Therefore, in internal processing involving data movement (processing performed asynchronously with timing of reception of an I/O command from a host device such as the storage controller 20) such as the reclamation processing and the refresh processing, in order to solve these problems, the FMPK controller 31 may determine a block at a moving destination of the data on the basis of the number of times of erasing of the block to thereby attain standardization of the number of times of erasing of the block. This may be a part of wear leveling. In this way, it is possible to reduce overhead only for the compression processing by executing the compression processing according to, for example, the time of reclamation that occurs in an FMPK.

The first embodiment is explained assuming the FMPK 30 in which the asynchronous compression mode is set. However, even when the asynchronous compression mode is set in the FMPK 30, content explained in the first embodiment can be carried out.

The FMPK controller 31 includes, for example, a command processing unit 301, a compression processing unit 302, a logical-physical page mapping table 310, and a physical-logical page mapping table 330. The command processing unit 301 and the compression processing unit 302 may be functions exhibited by the CPU 32 executing a program.

The command processing unit 301 processes commands (e.g., a read command and a write command) from a host device such as the storage controller 20. For example, the command processing unit 301 determines, on the basis of a compression necessity flag (a compression option) included in the write command, whether data is written in the FM chip 39 without being compressed or the data is compressed and written in the FM chip 39. When the compression necessity flag is "necessary", the command processing unit 301 causes the compression processing unit 302 to compress the data and writes the compressed data in the FM chip 39. When the compression necessity flag is "unnecessary", the command processing unit 301 writes the data in an uncompressed state in the FM chip 39.

The compression processing unit 302 compresses the data using the compression expansion circuit 36 and creates compressed data.

FIG. 14 shows a configuration example of the logical-physical page mapping table 310.

One logical-physical page mapping table 310 is created in the FMPK 30 and manages with which physical page 422 of the physical address space 420 the logical pages 412 configuring the logical address space 410 of the FMPK 30 are associated (see FIG. 4).

The logical-physical page mapping table 310 includes a plurality of entries 311a, 311b, and the like. Each of the entries includes, as data fields, a logical page number 312, a physical page number 313, a compression attribute 314, and a start address 315.

In the logical page number 312, a number capable of uniquely identifying the logical page 412 in the FMPK 30 is stored.

In the physical page number 313, a number capable of uniquely identifying the physical page 422 in the FMPK 30 is stored. "Unallocated" is stored in the physical page number 313 of the physical page 422 not allocated to the logical page 412.

In the compression attribute 314, information indicating whether data stored in the physical page 422 indicated by the physical page number 313 is compressed data is stored. For example, "compressed" is stored in the compression attribute 314 corresponding to the physical page 422 in which compressed data is stored. "Uncompressed" is stored in the compression attribute 314 of the physical page 422 in which uncompressed data is stored.

In the start address 315, when compressed data is stored in the physical page 422 indicated by the physical page number 313, a start position (an address) of the compressed data in the physical page 422 is stored.

For example, the entry 311a in FIG. 14 indicates that the logical page 412 of a logical page number "1" is associated with the physical page 422 of a physical page number "500", "compressed data" is stored in the physical page 422, and a start address of the compressed data in the physical page 422 is "0".

The entry 311b indicates that the logical page 412 of a logical page number "1000" is associated with the physical page 422 of a physical page number "500", "compressed data" is stored in the physical page 422, and a start address of the compressed data in the physical page 422 is "4096". In this way, compressed data separately managed in the logical page 412 are stored in the same physical page 422 in reality.

FIG. 15 shows a configuration example of the physical-logical page mapping table 330.

One physical-logical page mapping table 330 is created in the FMPK 30 and manages with which logical page 412 of the logical address space 410 the physical pages 422 configuring the physical address space 420 of the FMPK 30 are associated. That is, the physical-logical page mapping table 330 can also be considered a table for reverse lookup of the logical-physical page mapping table 310.

The physical-logical page mapping table 330 includes a plurality of entries 331a, 331b, and the like. Each of the entries includes, as data fields, a physical page number 332, a logical page number 333, and a compression state 334. The physical page number 332 and the logical page number 333 are as explained above.

In the compression state 334, information indicating whether compression is unnecessary for data stored in the physical page 422 indicated by the physical page number 332 is stored. In the compression state 334, concerning data for which compression is necessary, information indicating whether the data stored in the physical page 422 is already compressed or is planned to be compressed in future is stored. For example, when data for which compression is necessary and that is already compressed (hereinafter referred to as "compressed data") is stored in the physical page 422, "compressed" is stored in the compression state 334. When data for which compression is necessary and that is not compressed yet (hereinafter referred to as "compression planned data") is stored in the physical page 422, "planned" is stored in the compression state 334. When data for which compression is unnecessary is stored in the physical page 422, "unnecessary" is stored in the compression attribute 334. Since "unnecessary" of the compression attribute is managed in this way, the FMPK controller can determine that compression for the data is unnecessary even in the asynchronous processing. That is, if the compression attribute is "unnecessary", the FMPK controller maintains the data is an uncompressed state (an expanded state).

For example, the entry 331a in FIG. 15 indicates that the physical page 422 of a physical page number "300" is associated with the logical page 412 of a logical page number "100" and "compression planned data" is stored in the physical page 422.

The entry 331b indicates that the physical page 422 of a physical page number "500" is associated with two logical pages 412 of logical pages numbers "1" and "1000" and "compressed data" is stored in the physical page 422.

Figure 16:
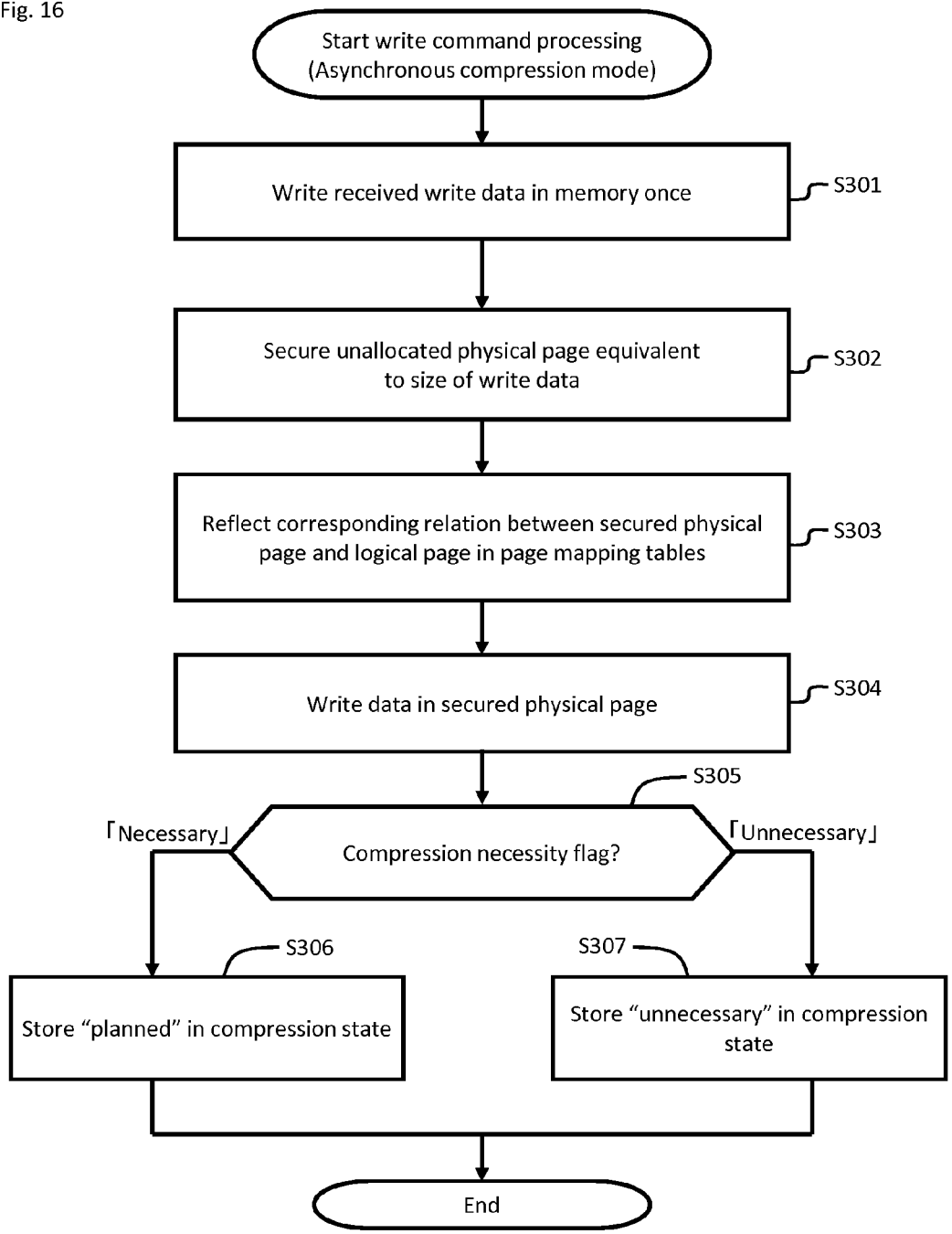
FIG. 16 is a flowchart showing a processing example of a command processing unit in the FMPK controller.

FIG. 16 is a flowchart showing a processing example of the command processing unit 301 in the FMPK controller 31.

Upon receiving the write command 1000 from the storage controller 20, the command processing unit 301 writes write data in the memory 34 once and performs subsequent processing (S301).

The command processing unit 301 secures the physical page 422 in an unallocated state equivalent to a data size 1003 of the write data designated by the write command 1000 (S302). The command processing unit 301 establishes an entry corresponding to the secured physical page 422 in the physical-logical page mapping table 330.

The command processing unit 301 calculates a logical page number corresponding to the top LBA 1002 indicated by the write command 1000 and registers a correspondence relation between a physical page number of the secured physical page 422 and the calculated logical page number in the physical-logical page mapping table 330. The command processing unit 301 also registers the correspondence relation between the physical page number and the logical page number in the logical-physical page mapping table 310 (S303).

The command processing unit 301 writes data in the secured physical page 422 (S304).

The command processing unit 301 determines whether the compression necessity flag related to the compression option 1004 of the write command 1000 is "necessary" (S305).

When the compression necessity flag is "unnecessary" (S305: unnecessary), the command processing unit 301 stores "unnecessary" in the compression state 334 corresponding to the physical page 422, in which the data is written, in the physical-logical page mapping table 330 (S307) and ends the processing (end).

When the compression necessity flag is "necessary" (S305: necessary), the command processing unit 301 stores "planned" in the compression state 334 corresponding to the physical page 422, in which the data is written, in the physical-logical page mapping table 330 (S306) and ends the processing (end).

According to the processing explained above, the FMPK controller 31 can determine, on the basis of the compression necessity flag of the write command 1000, whether write data is to be compressed.

Figure 17:
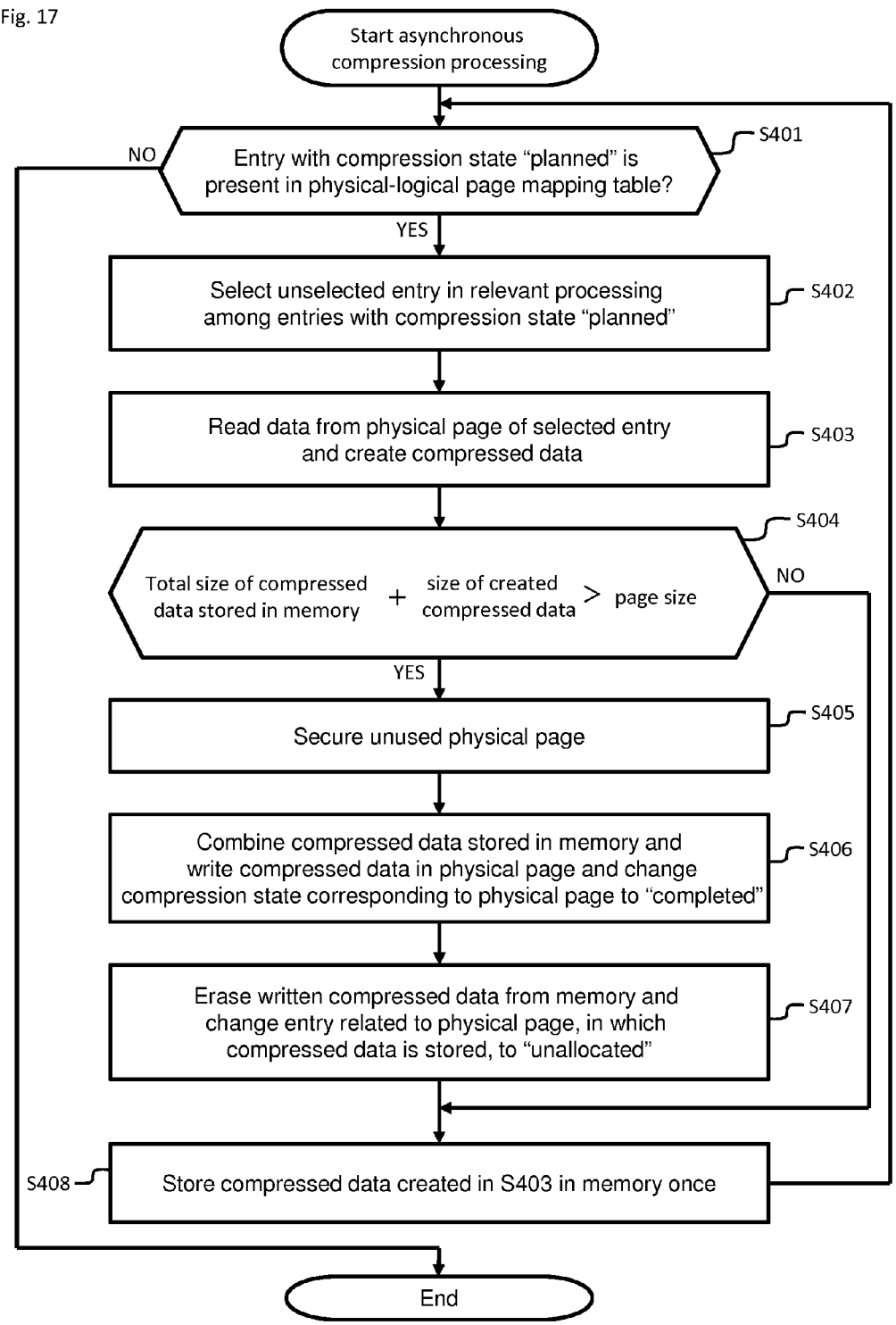
FIG. 17 is a flowchart showing a processing example for compressing and writing data in an asynchronous compression mode in the FMPK controller.

FIG. 17 is a flowchart showing a processing example for compressing and writing data in the asynchronous compression mode in the FMPK controller 31.

The FMPK controller 31 determines whether an entry in which the compression state 334 is "planned" is present in the physical-logical page mapping table 330 (S401).

When an entry in which the compression state 334 is "planned" is absent (S401: NO), the FMPK controller 31 ends the processing (end).

When an entry in which the compression state 334 is "planned" is present (S401: YES), the FMPK controller 31 selects one entry unselected in the processing among entries in which the compression state 334 is "planned" (S402).

The FMPK controller 31 reads data from the physical page 422 of the selected entry and creates compressed data (S403).

The FMPK controller 31 determines whether "(a total size of compressed data stored in the memory)+(a size of the compressed data created in S403)>(a physical page size)" (S404).

When the conditional expression in step S404 is not satisfied (S404: NO), the FMPK controller 31 proceeds to step S408.

When the conditional expression in step S404 is satisfied (S404: YES), the FMPK controller 31 secures the physical page 422 in an unused state (S405).

The FMPK controller 31 combines compressed data stored in the memory 34, writes the combined compressed data in the secured physical page 422, and changes the compression state 334 corresponding to the physical page 422 from "planned" to "compressed" (S406).

The FMPK controller 31 erases the written compressed data from the memory 34, changes an entry related to the physical page 422, in which the compressed data is stored, to "unallocated" in the logical-physical page mapping table 310 and the physical-logical page mapping table 330 (S407), and proceeds to step S408.

The FMPK controller 31 stores the compressed data created in step S403 in the memory 34 (S408) and returns to step S401.

According to the processing explained above, even when a size of one compressed data is smaller than a size of the physical page 422, it is possible to combine a plurality of compressed data and store the combined compressed data in the physical page 422. Therefore, it is possible to efficiently use a physical storage capacity configured from the FM chip 39.

According to the first embodiment, it is possible to reduce compression processing for data having a small compression effect in the FMPK 30. Consequently, since it is possible to reduce occurrence of unnecessary overhead in the FMPK 30, it is possible to improve the performance of the entire storage system 10.

Second Embodiment

Even if data having a size smaller than a page size of the physical page 422 is compressed and stored in the FM chip 39 in the FMPK 30, this does not lead to a reduction in overall consumption of the FMPK 30. As explained above, in the flash memory, data needs to be read and written in units of the physical page 422 because of the characteristic of the flash memory. For example, even if data of 8 KB is compressed to 1 KB, the physical page 422 equivalent to one page is consumed to store the data. Therefore, compressing, in the FMPK 30, data having a size smaller than the page size in the case of the synchronous compression mode is useless processing.

Therefore, in this embodiment, in transmitting a plurality of data, logical addresses of which in the FMPK 30 at a write destination are not consecutive, to the FMPK 30, the storage controller 20 collectively transmits a certain degree of data to the FMPK 30. The FMPK controller 31 consolidates the collectively transmitted data to create compressed data and writes the compressed data in the physical page 422. Details are explained below. Note that, in the following explanation, differences from the first embodiment are mainly explained and, concerning similarities to the first embodiment, explanation is omitted or simplified.

Figure 18:
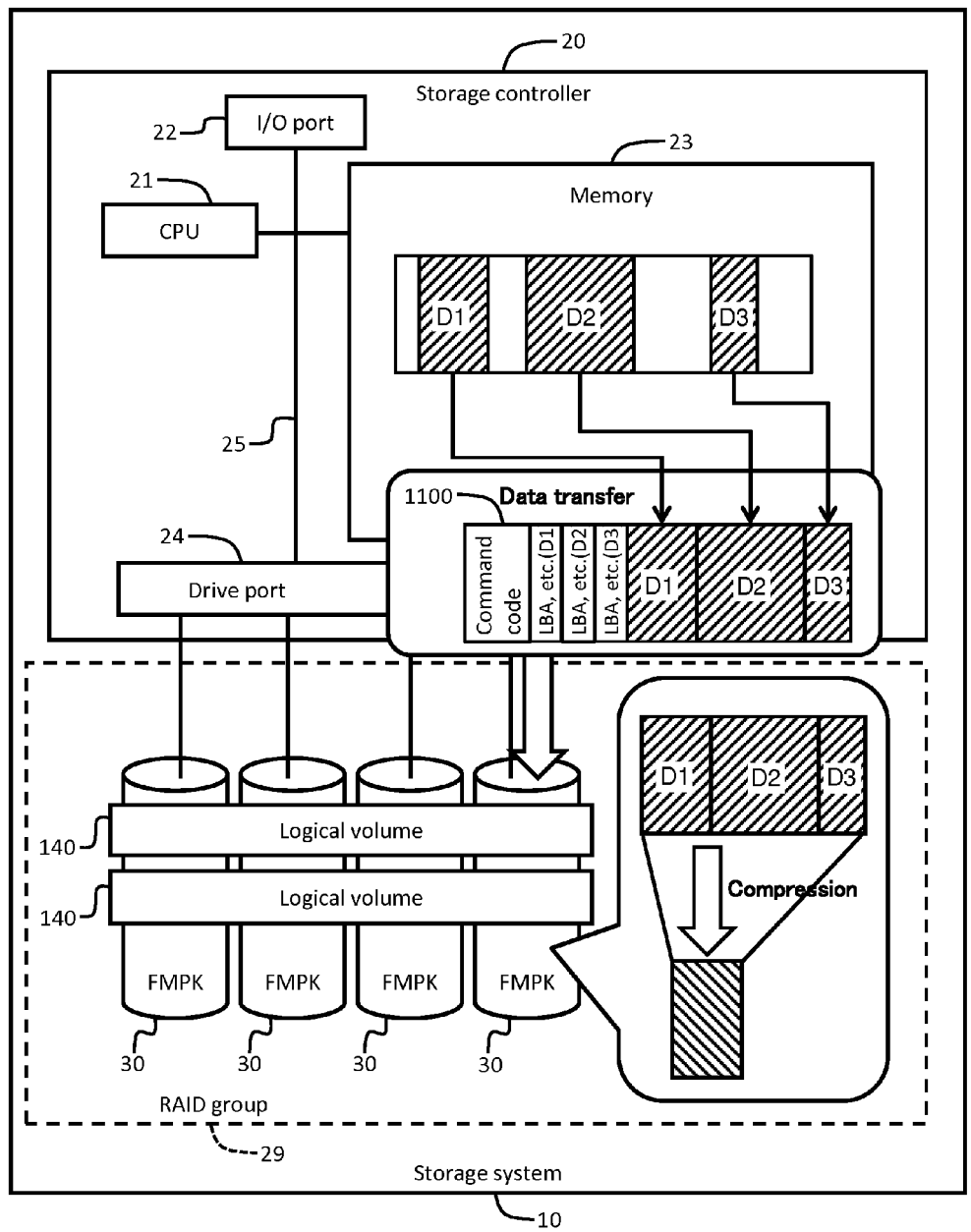
FIG. 18 is a schematic diagram showing a processing overview of a storage system in a second embodiment.

FIG. 18 is a schematic diagram showing a processing overview of the storage system 10 in a second embodiment.

In FIG. 18, the storage controller 20 stores, in predetermined cache areas of the memory 23, a plurality of write data D1, D2, and D3 respectively complying with a plurality of write requests received from the host computer 11. Concerning the respective write data D1, D2, and D3, storage destination LBAs designated by the write requests from the host computer 11 are not consecutive (i.e., the write data D1, D2, and D3 are random write data rather than sequence write data). Further, the write data D1, D2, and D3 are data not written in the FMPK 30 yet. Data received from the host computer 11 and not written in a storage device such as the FMPK 30 yet while being kept stored in a cache area in this way is referred to as "dirty data". On the other hand, data written in the storage device such as the FMPK 30 is referred to as "clean data".

As an example, it is assumed that data sizes of the respective dirty data D1, D2, and D3 shown in FIG. 18 are smaller than a page size in the FMPK 30. Therefore, when the dirty data D1, D2, and D3 are individually transmitted to the FMPK 30, the respective dirty data D1, D2, and D3 are individually compressed and written in the physical page 422. Then, consumption of a data transfer band between the storage controller 20 and the FMPK 30 increases. Moreover, unnecessary compression processing occurs in the FMPK controller 31. Note that, even if the data sizes of the respective dirty data D1, D2, and D3 are larger than the page size, if the storage controller collectively transfers the dirty data D1, D2, and D3, it is possible to reduce the number of times of the compression processing and suppress the number of physical pages in which the data after the compression is stored.

There is also a method of, as explained in the first embodiment, causing the FMPK 30 to operate in the asynchronous compression mode, storing compression-planned data in the FM chip 39 in an uncompressed state, collectively compressing a plurality of the compression-planned data at predetermined, and writing the data in the FM chip 39 again. However, in this method, since the number of times of write in the FM chip 39 increases, the life of the FM chip 39 is reduced as explained above.

Figure 19:
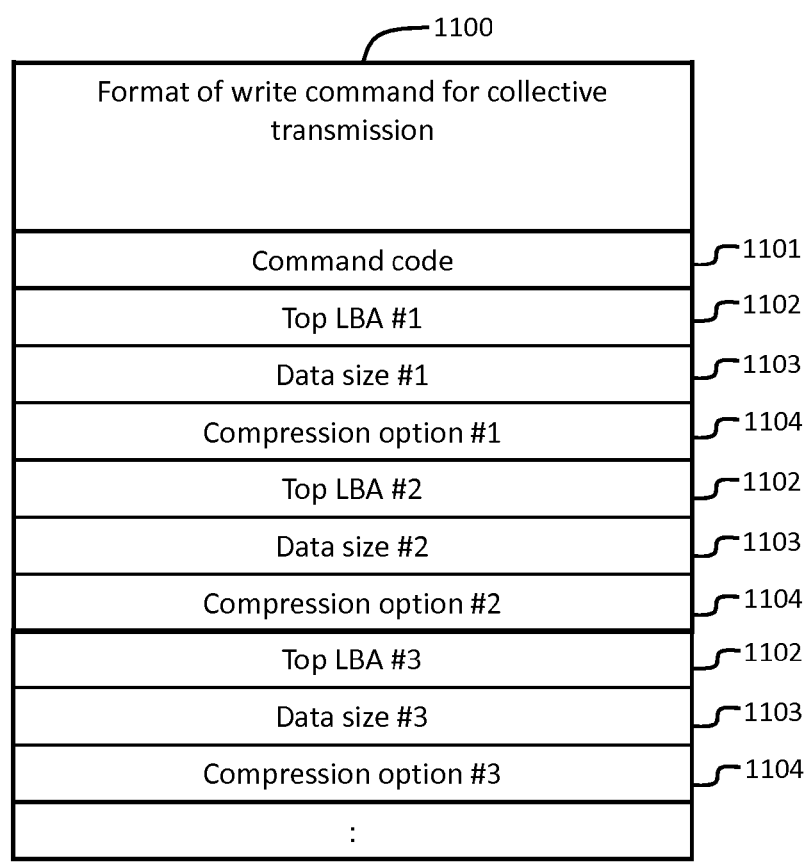
FIG. 19 shows a configuration example of a format of a write command for collective transmission.

Therefore, the storage controller 20 in this embodiment creates a write command for collective transmission 1100 for collectively transmitting a plurality of write data to the FMPK 30 as shown in FIG. 19 explained below.

FIG. 19 shows a configuration example of a format of the write command for collective transmission 1100.

The storage controller 20 creates the write command for collective transmission 1100 for each of the FMPKs 30 and transmits the created write command for collective transmission 1100 to the FMPK 30 corresponding thereto.

The write command for collective transmission 1100 includes a command code 1101 as a data field and includes, following the command code 1101, for each of a plurality of write data to be collectively transmitted, a top LBA 1102, a data size 1103, and a compression option 1104. That is, the storage controller 20 can consolidate data to be written in the same FMPK 30 using the write command for collective transmission 1100.

In the command code 1101, a code indicating that this command is a "write command" is stored. A code indicating a "write command for collective transmission" may be stored in the command code 1101. That is, in the command code, a code capable of distinguishing a normal write command and a write command including a compression option may be stored. The top LBA 1102, the data size 1103, and the compression option 1104 are as explained with reference to FIG. 10. Therefore, explanation of these data fields is omitted.

The write command for collective transmission 1100 includes a compression option 1104 for each of write data. A compression necessity flag can be set for each of the write data. This is because, although the write command for collective transmission 1100 is transmitted to one FMPK 30, the FMPK 30 sometimes configures, for example, the logical volume 140 having the encryption attribute and the logical volume 140 not having the encryption attribute. In this case, the storage controller 20 can create the write command for collective transmission 1100 in which the compression necessity flag corresponding to data to be written in the logical volume 140 having the encryption attribute is set to "unnecessary" and the compression necessity flag corresponding to data to be written in the logical volume 140 not having the encryption attribute is set to "necessary".

The write command for collective transmission 1100 may include one compression option rather than including the compression option 1104 for each of the write data. In this case, for example, when the compression necessity flag is set to "necessary", the FMPK 30 compresses all the write data. When the compression necessity flag is set to "unnecessary", the FMPK 30 does not compress all the write data.

The storage controller 20 consolidates dirty data for each of the logical volumes 140 of the FMPK 30 and creates the write command for collective transmission 1100. In this case, the write command for collective transmission 1100 may include a compression option for each of the write data or may include one compression option.

The storage controller 20 may creates, for the FMPK 30, the write data for collective transmission 1100 obtained by consolidating dirty data for which compression is necessary and dirty data for which compression is unnecessary. In this case, the write command for collective transmission 1100 may include one compression option.

The storage controller 20 may provide an upper limit value of the number of dirty data that can be collectively transmitted by the write data for collective transmission 1100.

Figure 20:
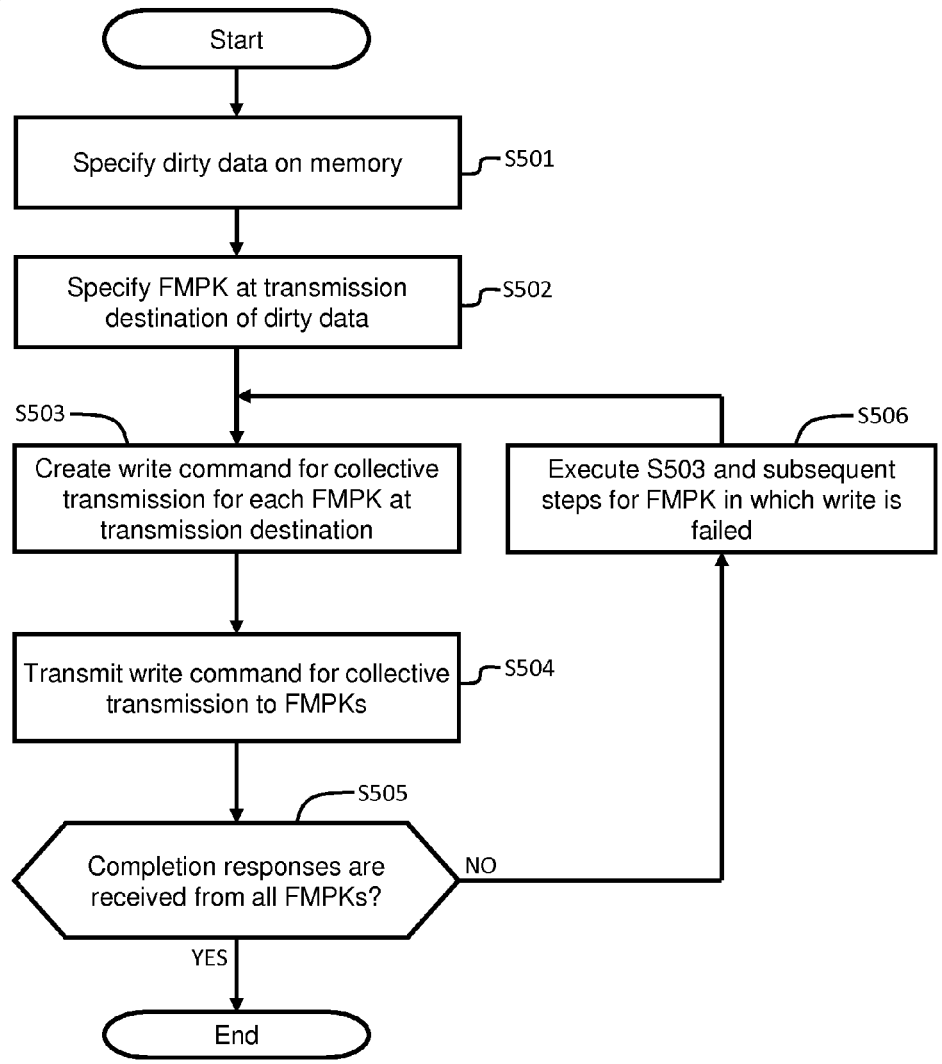
FIG. 20 is a flowchart showing an example of processing for creating a write command for collective transmission in a storage controller.

FIG. 20 is a flowchart showing an example of processing for creating the write command for collective transmission 110 in the storage controller 20.

The storage controller 20 may execute the processing at a fixed cycle. The storage controller 20 may execute the processing when a total size of dirty data stored in the cache area is equal to or larger than a predetermined size. For example, the storage controller 20 executes the processing when the total size of the dirty data stored in the cache area is equal to or larger than the size of the physical page 422. Alternatively, the storage controller 20 may execute the processing when write data received anew from the host computer 11 cannot be written in the cache area because of a capacity shortage of the cache area. The flowchart is explained below.

The storage controller 20 refers to predetermined cache management information and specifies dirty data stored in the cache area (S501).

The storage controller 20 specifies, on the basis of an address of a chunk allocated to a write destination of the specified dirty data (an address of the chunk in the logical volume 140), the FMPK 30 to be set as a transmission destination of the dirty data (S502).

The storage controller 20 creates the write command for collective transmission 1100 for each of the FMPKs 30 to be set as a transmission destination of the dirty data (S503). When transmitting two or more dirty data to the same FMPK 30, the storage controller 20 may create the write command for collective transmission 1100 shown in FIG. 19. When transmitting one dirty data to the same FMPK 30, the storage controller 20 may create the write command 1000 shown in FIG. 10.

The storage controller 20 transmits the created write command for collective transmission 1100 to the FMPKs 30 (S504).

When the storage controller 20 does not receive a completion response from a part of the FMPKs 30 even when a fixed time elapses or receives a failure response (S505: NO), the storage controller 20 specifies the FMPK 30 in which write is failed and executes the processing in step S503 and subsequent steps again for the FMPK 30 in which write is failed (S506).

When the storage controller 20 receives the completion response from all the FMPKs 30 (S505: YES), the storage controller 20 ends the processing (end).

According to the processing explained above, the storage controller 20 can create the write command for collective transmission 1100 and transmit the created write command for collective transmission 1100 to the FMPKs 30.

Figure 21:
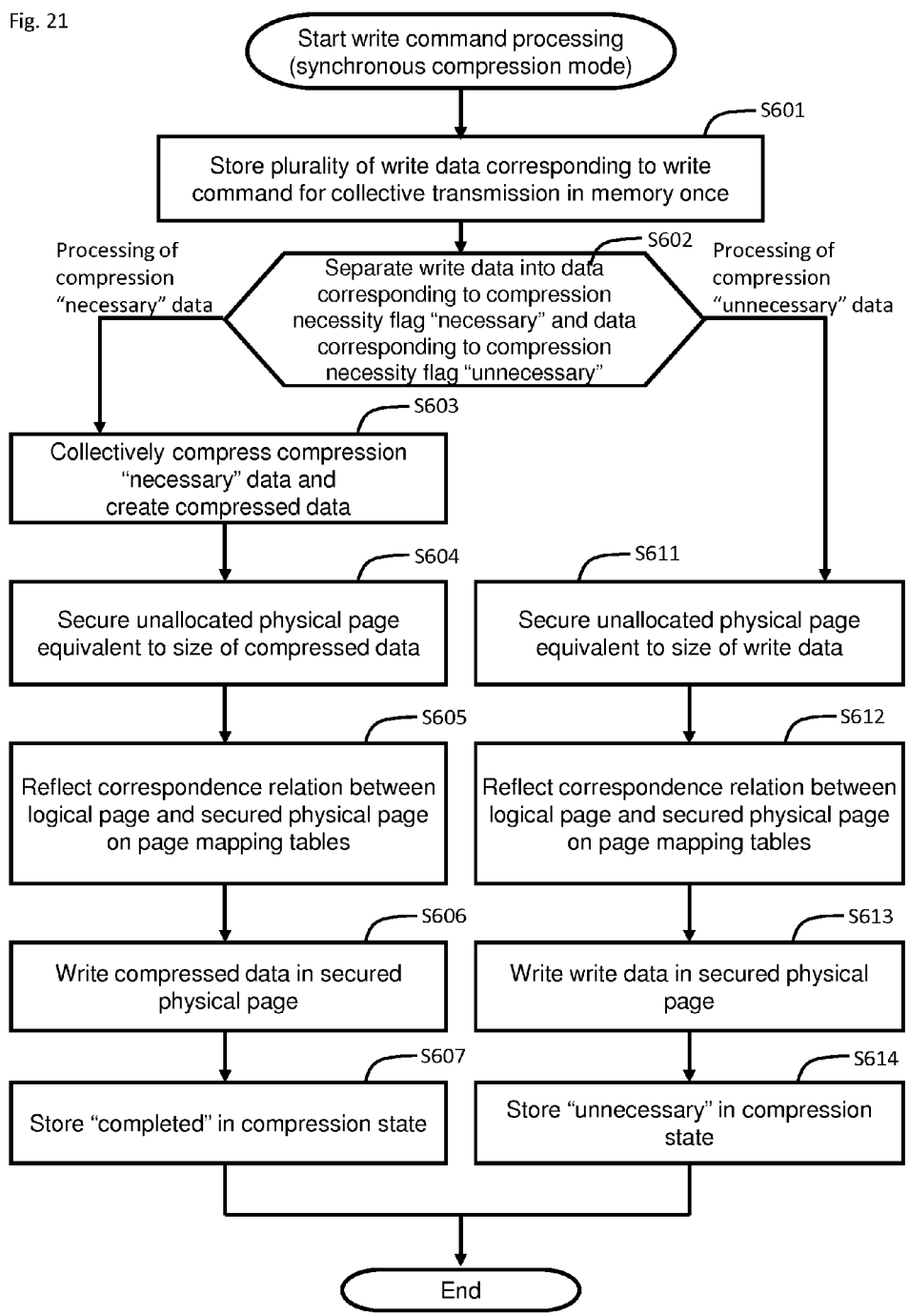
FIG. 21 is a flowchart showing a processing example performed when write data for collective transmission is received in an FMPK controller.

FIG. 21 is a flowchart showing a processing example performed when the FMPK controller 31 receives the write data for collective transmission 1100.

Upon receiving the write command for collective transmission 1100 from the storage controller 20, the FMPK controller 31 stores a plurality of write data corresponding to the write command for collective transmission 1100 in the memory 34 once (S601).

The FMPK controller 31 separates, in the write command for collective transmission 1100, the write data corresponding to the compression necessity flag "necessary" and the write data corresponding to the compression necessity flag "unnecessary" and executes processing explained below for the respective write data (S602).

<Processing of the Write Data Corresponding to the Compression Necessity Flag "Necessary">

The FMPK controller 31 collectively compresses the write data corresponding to the compression necessity flag "necessary" and creates compressed data (S603).

The FMPK controller 31 secures the physical page 422 in an unallocated state equivalent to the size of the compressed data (S604). This processing is, for example, processing same as step S302 in FIG. 16.

The FMPK controller 31 reflects a correspondence relation between the logical page 412 and the secured physical page 422 on the logical-physical page mapping table 310 and the physical-logical page mapping table 330 (S605). This processing is, for example, processing same as step S303 in FIG. 16.

The FMPK controller 31 writes the compressed data in the secured physical page 422 (S606). This processing is, for example, processing same as step S304 in FIG. 16.

The FMPK controller 31 stores, in the physical-logical page mapping table 330, "completed" in the compression state 334 of an entry corresponding to the physical page 422 at a write destination (S607) and ends the processing (end). Unlike step S306 in FIG. 16, the FMPK controller 31 stores "completed" in the compression state 334. This is because a "synchronous compression mode" is set.

<Processing of the Write Data Corresponding to the Compression Necessity Flag "Unnecessary">

The FMPK controller 31 secures the physical page 422 in an unallocated state equivalent to the size of the write data (S611). This processing is, for example, processing same as step S302 in FIG. 16.

The FMPK controller 31 reflects a correspondence relation between the logical page 412 and the secured physical page 422 on the logical-physical page mapping table 310 and the physical-logical page mapping table 330 (S612). This processing is, for example, processing same as step S303 in FIG. 16.

The FMPK controller 31 writes the write data in the secured physical page 422 (S613). This processing is, for example, processing same as step S304 in FIG. 16.

The FMPK controller 31 stores, in the logical-physical page mapping table 330, "unnecessary" in the compression state 334 of an entry corresponding to the written physical page 422 (S614) and ends the processing (end). This processing is, for example, processing same as step S306 in FIG. 16.

According to the second embodiment, the storage controller 20 can transmit a plurality of dirty data to the FMPK 30 by transmitting the write command for collective transmission 1100 once (or a small number of times). Consequently, it is possible to suppress consumption of a data transmission band between the storage controller 20 and the FMPK 30 compared with consumption of the data transmission band consumed when the storage controller 20 transmits the plurality of dirty data by transmitting the individual write commands 1000.

The FMPK controller 31 can collectively compress a plurality of write data. Consequently, it is possible to reduce a processing load on the FMPK controller 31 compared with a processing load applied to the FMPK controller 31 when the FMPK controller 31 individually compresses the dirty data. As these effects, higher effects can be obtained when the size of the dirty data is small (e.g., smaller than the page size).

Third Embodiment

The FMPK 30 having the compression function can provide the storage controller 20 with a logical storage area (e.g., 8 TB) larger than a physical storage area (e.g., 1 TB) configured from the plurality of FM chips 39.

Upon receiving the write command 1000 for data having a large size, the FMPK controller 31 set in the asynchronous compression mode writes the write data in a physical storage area once without compressing the write data. However, when a free area larger than the write data is absent in the physical storage area, the FMPK controller 31 cannot write the data. On the other hand, the FMPK controller 31 set in the synchronous compression mode sequentially compresses the received write data and writes the compressed write data in the physical storage area. Therefore, a free capacity larger than the write data does not always have to be present in the physical storage area.

Therefore, in this embodiment, a "compression mode switching command" capable of indicating switching of the synchronous compression mode and the asynchronous compression mode to the FMPK controller 31 is introduced anew. The storage controller 20 transmits, before transmitting the write command 1000 for data having a large size to the FMPK 30, the compression mode switching command for indicating switching to the synchronous compression mode to the FMPK 30. Thereafter, the storage controller 20 transmits the write command 1000 to the FMPK 30. When the FMPK controller 31 receives the compression mode switching command, according to the compression mode designated in the compression mode switching command, the FMPK controller 31 compresses and stores data received thereafter.

A setting flag for the synchronous compression mode or the asynchronous compression mode is added to the compression option 1004 of the write command 1000. For example, any one of "unnecessary", "asynchronous compression necessary", and "synchronous compression necessary" may be able to be set in the compression option 1004 in combination with the compression necessity flag. For example, when the size of data is larger than a threshold, the storage controller 20 sets the "synchronous compression necessary" in the compression option 1004 of the write command 1000 and transmits the write command 1000 to the FMPK 30. When the "synchronous compression necessary" is set in the compression option 1004, the FMPK controller 31 compresses write data in the synchronous compression mode and writes the write data.

Write date having a large data size is stored at a time, for example, when correction copy, format, initial copy of a volume, and the like are executed. The correction copy is processing related to data restoration by a RAID function, for example, processing for causing a spare storage device or the like to recover data when one drive configuring a RAID is in failure. The format is processing for initializing a volume, for example, writing zero data in the entire volume. The initial copy of a volume is processing for copying all data in a certain volume to another volume.

The correction copy is executed in units of the FMPK 30. When executing the correction copy, the storage controller 20 transmits a predetermined command to the FMPK 30 set as a processing target.

The initial copy of a volume is executed in volume units. When executing the initial copy of a volume, the storage controller 20 specifies a plurality of the FMPKs 30 configuring the volume and transmits a predetermined command to the respective specified plurality of FMPKs 30.

Figure 22:
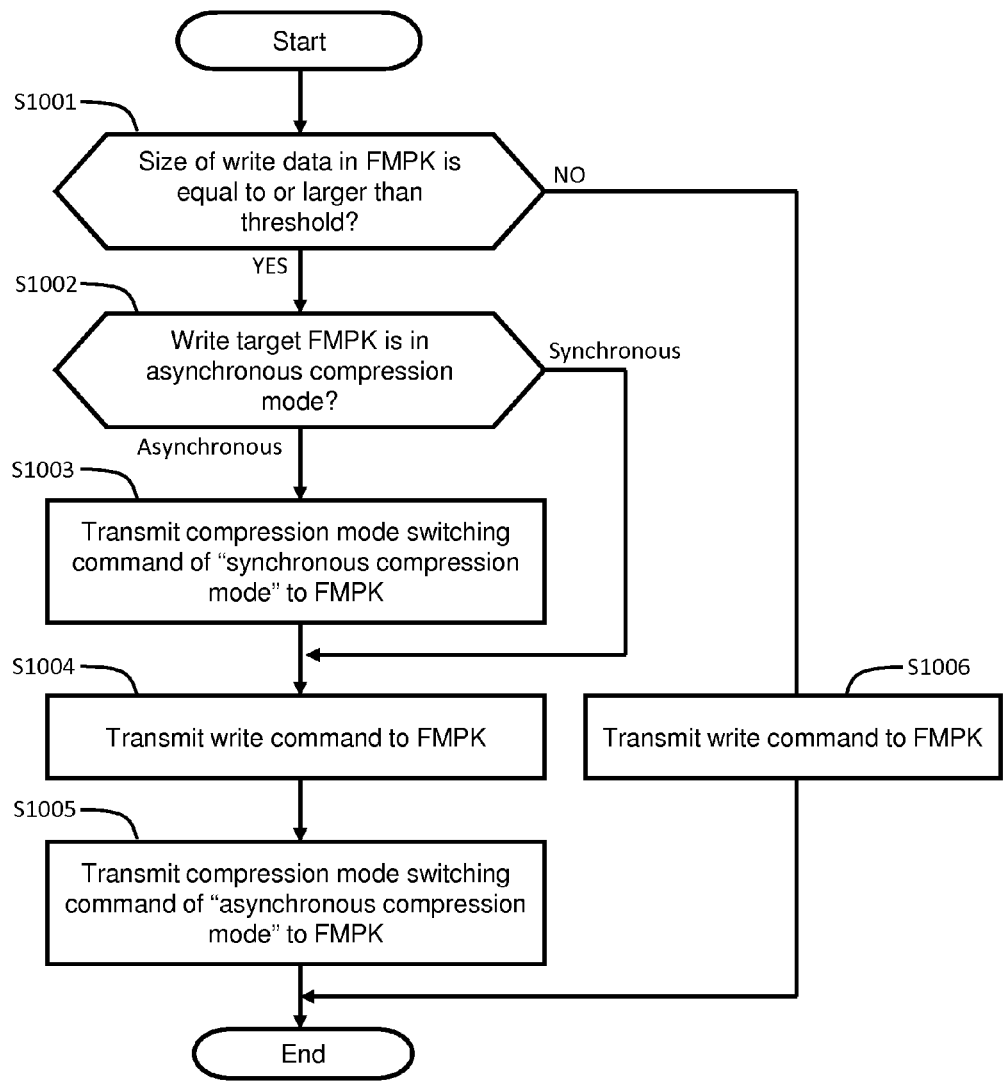
FIG. 22 is a flowchart showing an example of processing in a storage controller in which a compression mode switching command is introduced.

FIG. 22 is a flowchart showing an example of processing in the storage controller 20 performed when the compression mode switching command is introduced.

The storage controller 20 determines whether the size of write data is equal to or larger than a threshold (S1001). The threshold may be a predetermined value or may be a value determined on the basis of a free capacity of the FMPK 30 set as a write target (e.g., a value of 90% of the free capacity).

When "the size of the write data<the threshold" (S1001: NO), the storage controller 20 transmits the write command 1000 to the write target FMPK 30 (S1006) and ends the processing (end).

When "the size of the write data≥the threshold" (S1001: YES), the storage controller 20 determines whether the write target FMPK 30 is in the asynchronous compression mode (S1002). The storage controller 20 may adopt a configuration for managing compression modes of the FMPKs 30 in a predetermined table or may adopt a configuration for inquiring the FMPK 30 of a compression mode every time.

When the write target FMPK 30 is in the asynchronous compression mode (S1002: asynchronous), the storage controller 20 transmits the "compression mode switching command" for indicating a change to the synchronous compression mode to the write target FMPK 30 (S1003) and proceeds to step S1004.

When the write target FMPK 30 is in the synchronous compression mode (S1002: synchronous), the storage controller 20 directly proceeds to step S1004. That is, the write target FMPK 30 is in the synchronous compression mode at a stage of step S1004.

The storage controller 20 transmits a write command in which "necessary" is set in the compression necessity flag to the write target FMPK 30 (S1004). The FMPK 30 receives the write command, compresses data in the synchronous compression mode, and writes the compressed data in the FM chip 39.

Thereafter (for example, after receiving a completion response from the FMPK 30), the storage controller 20 transmits the "compression mode switching command" for indicating a change to the asynchronous compression mode to the write target FMPK 30 (S1005) and ends the processing (end).

The storage controller 20 may execute the processing in step S1002 and subsequent steps taking the opportunity of a request for the correction copy, the format, the initial copy of a volume, or the like.

When the "synchronous compression mode" is indicated by the compression mode switching command, the FMPK 30 may compress and write the write data even when a write command received thereafter does not include the compress necessity flag "unnecessary" or the compression option.

Figure 23:
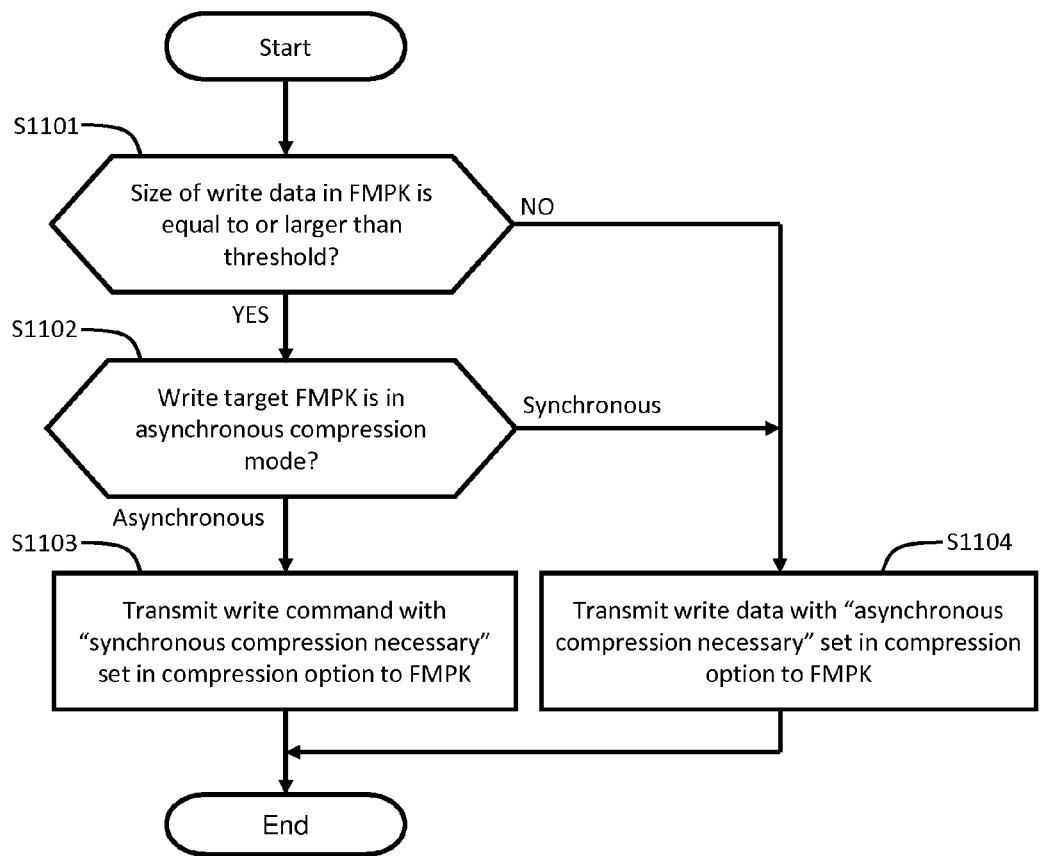
FIG. 23 is a flowchart showing an example of processing in a storage controller in which a flag of a compression mode is added to a compression option.

FIG. 23 is a flowchart showing an example of processing in the storage controller 20 performed when a flag of a compression mode is added to the compression option 1004.

The storage controller 20 determines whether the size of write data is equal to or larger than a threshold (S1101). This is processing same as step S1001 in FIG. 22.

When "the size of the write data<the threshold" (S1101: NO), the storage controller 20 proceeds to processing in step S1104.

When "the size of the write data≥the threshold" (S1101: YES), the storage controller 20 determines whether the FMPK 30 set as a write target is in the asynchronous compression mode (S1102). When the write target FMPK 30 is adapted to only the asynchronous compression mode, the storage controller 20 may omit step S1102 and proceed to step S1103.

When the write target FMPK 30 is in the asynchronous compression mode (S1102: asynchronous), the storage controller 20 creates the write command 1000 in which the "synchronous compression necessary" is set in the compression option 1004, transmits the write command 1000 to the write target FMPK 30 (S1003), and ends the processing (end). The FMPK 30 receives the write command 1000 and writes data in the synchronous compression mode. At this point, the FMPK 30 may write only data corresponding to the write command in the synchronous compression mode.

When the write target FMPK 30 is in the synchronous compression mode (S1102: synchronous) or "the size of the write data<the threshold" in step S1101 (S1101: NO), the storage controller 20 creates a write command in which the "asynchronous compression necessary" is set, transmits the write command to the write target FMPK 30 (S1104), and ends the processing (end).

The configuration according to the third embodiment is also applicable to the write command for collective transmission 1100 explained in the second embodiment.

According to the third embodiment, the storage controller 20 can switch, according to the size of data to be written in the FMPK 30, the synchronous compression mode and the asynchronous compression mode of the FMPK 30. That is, even when a free capacity of the FMPK 30 is small, the storage controller 20 can store data having a large size in the FMPK 30.

The embodiments explained above are illustrations for the explanation of the present invention and are not intended to limit the scope of the present invention to only the embodiments. Those skilled in the art can carry out the present invention in various forms without departing from the spirit of the present invention.

REFERENCE SIGNS LIST

10 Storage system
11 Host computer
12 Management apparatus
20 Storage controller
30 FMPK (Flash Memory Package)

The invention claimed is:

1. A storage system comprising:
a plurality of storage devices, each including a storage medium and a media controller configured to compress data to be stored in the storage medium; and
a storage controller configured to receive a first write request involving first data from a host computer and transmit a first write command, which is a write command involving second data based on the first data and includes compression necessity information indicating necessity of compression of the second data, to a storage device at a write destination conforming to the first write request among the plurality of storage devices, wherein
the media controller of the storage device at the write destination is configured to receive the first write command from the storage controller and, when the compression necessity information included in the first write command indicates that compression is unnecessary, store the second data in the storage medium without compressing the second data, and
each of the plurality of storage devices is configured to include a synchronous compression mode for, if compression necessity information in a write command received from the storage controller indicates that compression is necessary, compressing data complying with the write command and writing the compressed data in the storage medium, and an asynchronous compression mode for, even if the compression necessity information in the write command indicates that compression is necessary, writing the data complying with the write command in the storage medium without compressing the data and thereafter reading the data from the storage medium, compressing the data, and writing the compressed data in the storage medium, and
the storage controller is configured to indicate to the storage device at the write destination in which mode of the synchronous compression mode and the asynchronous compression mode the second data is to be compressed.

2. The storage system according to claim 1, wherein the media controller in each of the plurality of storage devices is configured to perform internal movement processing for moving data stored in a certain area of the storage medium to another area of the storage medium without receiving a write command from the storage controller, and set, among data stored in the storage medium, data corresponding to the asynchronous compression mode as movement target data, and in the internal movement processing, movement of the data corresponding to the asynchronous compression mode involves reading data from the storage medium, compressing the data, and writing the compressed data in the storage medium.

3. The storage system according to claim 1, wherein the first write command includes compression mode information indicating in which mode of the synchronous compression mode and the asynchronous compression mode the second data is to be compressed, and the storage device at the write destination is configured to compress the second data according to the compression mode indicated by the compression mode information included in the first write command.

4. The storage system according to claim 3, wherein the storage controller is configured to set, when a size of the second data is equal to or larger than a threshold, the compression mode information as information indicating the synchronous compression mode.

5. A data write method in a storage system including: a plurality of storage devices, each including a storage medium and a media controller having a compression function for data to be written in the storage medium; and a storage controller, the data write method comprising:

the storage controller receiving a first write request for first data from a host computer and transmitting a first write command, which is a write command for second data based on the first data and includes compression necessity information indicating necessity of compression of the second data, to a storage device at a write destination conforming to the first write request among the plurality of storage devices; and the media controller of the storage device at the write destination receiving the first write command from the storage controller and, when the compression necessity information included in the first write command indicates that compression is unnecessary, storing the second data in the storage medium without compressing the second data, and each of the plurality of storage devices including a synchronous compression mode for, if compression necessity information in a write command received from the storage controller indicates that compression is necessary, compressing data complying with the write command and writing the compressed data in the storage medium, and an asynchronous compression mode for, even if the compression necessity information in the write command indicates that compression is necessary, writing the data complying with the write command in the storage medium without compressing the data and thereafter reading the data from the storage medium, compressing the data, and writing the compressed data in the storage medium, and the storage controller indicating to the storage device at the write destination in which mode of the synchronous compression mode and the asynchronous compression mode the second data is to be compressed.

* * * * *